(12) United States Patent
Jang et al.

(10) Patent No.: US 9,413,875 B2
(45) Date of Patent: Aug. 9, 2016

(54) MOBILE TERMINAL AND CONTROL METHOD FOR THE MOBILE TERMINAL

(71) Applicant: LG ELECTRONICS INC., Seoul (KR)

(72) Inventors: Yujune Jang, Seoul (KR); Jeongyun Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/513,063

(22) Filed: Oct. 13, 2014

(65) Prior Publication Data

US 2015/0156308 A1 Jun. 4, 2015

(30) Foreign Application Priority Data

Nov. 29, 2013 (KR) .................. 10-2013-0147804

(51) Int. Cl.
| | |
|---|---|
| *H04M 1/66* | (2006.01) |
| *H04M 1/68* | (2006.01) |
| *H04M 3/16* | (2006.01) |
| *H04M 1/725* | (2006.01) |
| *H04M 1/656* | (2006.01) |
| *H04M 1/67* | (2006.01) |
| *H04W 4/06* | (2009.01) |
| *H04W 12/08* | (2009.01) |
| *H04W 88/06* | (2009.01) |

(52) U.S. Cl.
CPC .......... *H04M 1/72569* (2013.01); *H04M 1/656* (2013.01); *H04M 1/67* (2013.01); *H04M 1/72519* (2013.01); *H04M 1/72577* (2013.01); *H04W 4/06* (2013.01); *H04W 12/08* (2013.01); *H04M 2250/12* (2013.01); *H04M 2250/62* (2013.01); *H04W 88/06* (2013.01)

(58) Field of Classification Search
CPC .............. H04M 1/72569; H04M 1/72577; H04M 1/656; H04M 1/67; H04M 1/72519; H04M 2250/12; H04M 2250/62; H04W 12/08; H04W 4/06; H04W 88/06
See application file for complete search history.

(56) References Cited

U.S. PATENT DOCUMENTS

| | | | | |
|---|---|---|---|---|
| 8,660,532 | B2 * | 2/2014 | Conti et al. | .......... 455/411 |
| 2006/0148490 | A1 * | 7/2006 | Bates | .......... H04W 48/02 455/456.1 |
| 2009/0060170 | A1 * | 3/2009 | Coughlan | .......... H04M 1/605 379/433.02 |
| 2013/0023248 | A1 | 1/2013 | Lee | |

(Continued)

FOREIGN PATENT DOCUMENTS

JP    2001-309025    11/2001

OTHER PUBLICATIONS

European Patent Office Application Serial No. 14003571.8, Search Report dated Mar. 5, 2015, 6 pages.

*Primary Examiner* — Erin File
(74) *Attorney, Agent, or Firm* — Lee, Hong, Degerman, Kang & Waimey; Jonathan Kang; Harry Lee

(57) ABSTRACT

The present disclosure relates to a mobile terminal and control methods thereof. According to one embodiment of the present disclosure, a mobile terminal may include a wireless communication unit provided in a main body of the mobile terminal to communicate with at least one external device to perform a call function; a sensing unit configured to sense a movement of the main body while performing the call function; and a controller configured to process at least one function associated with the call function currently being performed in response to the movement of the main body.

11 Claims, 13 Drawing Sheets

(56) References Cited

U.S. PATENT DOCUMENTS

| | | | |
|---|---|---|---|
| 2013/0040601 A1* | 2/2013 | Oh | H04M 1/72519 455/405 |
| 2013/0095886 A1 | 4/2013 | Hong et al. | |
| 2013/0141514 A1* | 6/2013 | Chao | H04M 1/7253 348/14.02 |
| 2014/0141755 A1* | 5/2014 | Dwarkaprasad | H04W 76/00 455/414.1 |
| 2014/0192992 A1* | 7/2014 | Lee | H04R 5/04 381/60 |
| 2014/0218519 A1* | 8/2014 | Borovinov | 348/143 |
| 2014/0335840 A1* | 11/2014 | Carr et al. | 455/417 |
| 2015/0092979 A1* | 4/2015 | Meredith et al. | 382/103 |

* cited by examiner (a)

(b)

MOBILE TERMINAL AND CONTROL METHOD FOR THE MOBILE TERMINAL

RELATED APPLICATION

Pursuant to 35 USC §119(a), this application claims the benefit of earlier filing date and right of priority to Korean Application No. 10-2013-0147804, filed on Nov. 29, 2013, the contents of which is incorporated by reference herein in its entirety.

BACKGROUND OF THE INVENTION

1. Field of the Invention

The present disclosure relates to a mobile terminal and a control method thereof.

2. Description of the Related Art

Currently, mobile terminal devices have being realized to be multimedia devices competent to perform numerous functions, such as capturing video and photographs. Also, due to the progress of technology, such mobile terminal devices have been developed to accommodate more diverse services supported by advanced technical features. For instance, in response to receiving a plurality of incoming calls, the mobile terminal can selectively process either one call or multiple calls depending on a phone user convenience. Furthermore, a user is allowed to switch a call counterpart while a mobile terminal is processing a current call.

While recent mobile terminals have been configured with those multiple functions, they have need of easy and convenient ways to execute those functions. Especially, while the mobile terminal has been conducting a phone call, performing steps to execute available functions could be a cumbersome, and thereby methods for easy execution of those functions are urgently demanded.

Also, existing mobile terminals performing those multi functions have need for a user's touch input to implement a respective function, which is tedious and can be a time consuming task. For example, the mobile terminals, which have an advanced a call record function, demands a touch input as a necessary condition. With this mobile terminal, the user need to spend time to enter touch input to initiate a corresponding function, thereby assuming the risk of missing a chance to record the conversation of the call which has been taken place during entering the touch input.

SUMMARY OF THE INVENTION

One aspect of the present disclosure is to provide a mobile terminal or methods to perform a desired function without entering a touch input to the mobile terminal.

Another aspect of the present disclosure is to provide a mobile terminal or methods thereof by which a phone user is able to easily implement functions associated with a call function while the mobile terminal performs the call function.

Another aspect of the present disclosure is to provide a mobile terminal or methods thereof to perform a user desired function by recognizing the user's habitual behavior even if the user has not intended to initiate the desired function.

Another aspect of the present disclosure is to provide a mobile terminal or methods thereof to select and perform a function a phone user has desired without any time delay by not requiring a touch input from the user.

For this purpose, A mobile terminal according to one embodiment may include a wireless communication unit provided in a main body of the mobile terminal to communicate with at least one external device to perform a call function; a sensing unit configured to sense a position movement of the main body while performing the call function; and a controller configured to process at least one function associated with the call function currently being performed in response to the movement of the main body.

According to one embodiment, the sensing unit comprises at least one gesture sensor to sense a user's gesture, and the controller determines that the main body has been moved based on user gesture information prestored in a memory unit disposed at the main body in response to sensing the user's gesture.

According to one embodiment, the user's gesture is a gesture putting the mobile terminal to a position adjacent to one ear of a user from a position adjacent to the other ear of the user.

According to one embodiment, the sensing unit comprises a sensor to sense an ear of a user placed adjacent to the main body, and the controller identifies whether a currently sensed ear of a user is a left or right ear of the user based on sensed results from the sensing unit and user ear identification information prestored in a memory unit disposed at the main body, and determines that the main body has been moved in response to sensing that the sensed ear has subsequently changed.

According to one embodiment, the controller, in response to receiving a different call during the processing of a first call, connects a second call by switching to a counterpart of the different call based on a sensed position movement of the mobile terminal.

According to one embodiment, the mobile terminal further comprises a display unit configured to display a call log of the mobile terminal, wherein the controller displays a record of the first call including a log of the second call at least one region of the display unit in response to a request to display the log of the first call.

According to one embodiment, the controller records a conversation of a call based on a sensed position movement of the mobile terminal while the mobile terminal is processing a call.

According to one embodiment, the controller performs a group call based on a sensed position movement of the mobile terminal in response to receiving at least two different calls while the mobile terminal is processing a call.

According to one embodiment, the controller performs the group call based on the sensed position movement in response to sensing that the main body has been moved and put into a parallel position to the ground.

According to one embodiment, the mobile terminal further comprises a display unit configured to display a list of call counterparts belonging to the group call at least one region of the mobile terminal, wherein the controller displays a graphical object, which is corresponding to at least one function to control the group call state, being matched to the call counterparts respectively, and controls a state of the group call of at least one of the call counterparts based on a user's selection on the graphical object.

According to one embodiment, the controller, when prestored ear identification information matching sensed results of the sensing unit is found to be not available, switches to either a first operation mode limiting functions associated with the call function or a second operation mode limiting all functions of the mobile terminal.

According to one embodiment, the sensing unit further comprises a sensor to sense the surrounding condition of the mobile terminal, wherein the controller, when prestored ear identification information matching sensed results of the sensing unit is found to be not available, determines whether the mobile terminal has been stolen based upon the sensed surrounding condition, then switches to the second operation mode in response to when the mobile terminal has been stolen, and if not, switches to the first operation mode.

According to one embodiment, the controller senses a user's ear adjacent to the mobile terminal again, and switches to a preset operation mode of the mobile terminal from the first operation mode or the second operation mode in response to when prestored ear identification information matching sensed results from the sensing unit is found to be available.

According to one embodiment, a control method of a mobile terminal may include sensing an arrival of a different call while performing a call function; sensing a position movement of a main body of a mobile terminal; and processing at least one function associated with the call function currently being performed in response to when a position movement of the main body has been occurred.

According to one embodiment, said sensing a movement of the main body further comprises sensing a user's gesture and determining that the main body has been moved based on user gesture information prestored in a memory unit of the mobile terminal in response to sensing the user's gesture.

According to one embodiment, said sensing a movement of the main body further comprises sensing an ear of a user placed adjacent to the main body; identifying whether the sensed ear of user is a left or right ear of the user based on the sensed ear results and user ear identification information prestored in a memory unit of the mobile terminal; and determining that the main body has been moved in response to sensing that the sensed ear has subsequently changed.

According to one embodiment, said sensing an ear of the user further comprises comparing the sensed ear results with user ear identification information prestored in a memory unit of the mobile terminal; and switching to either a third operation mode limiting functions associated with the call function or a fourth operation mode limiting all functions of the mobile terminal in response to when prestored ear identification information matching sensed results is found to be not available.

According to one embodiment, said switching to one of either operation modes further comprises sensing a surrounding environment of the mobile terminal when prestored ear identification information matching sensed ear results is found to be not available; determining whether the mobile terminal is stolen based on the sensed surrounding environment; and switching to a fourth operation mode in response to sensing that the mobile terminal has been stolen, and if not so, then to a third operation mode.

According to one embodiment, said switching to the third operation mode or the fourth operation mode further comprises sensing a user's ear adjacent to the mobile terminal again and switching to a preset operation mode of the mobile terminal from the third operation mode or the fourth operation mode in response to when prestored ear identification information matching the re-sensed ear results of a user is found to be available.

BRIEF DESCRIPTION OF THE DRAWINGS

The accompanying drawings, which are included to provide a further understanding of the invention and are incorporated in and constitute a part of this specification, illustrate embodiments of the invention and serve to explain the principles of the invention together with the description In the drawings.

DETAILED DESCRIPTION OF THE INVENTION

Figure 1:
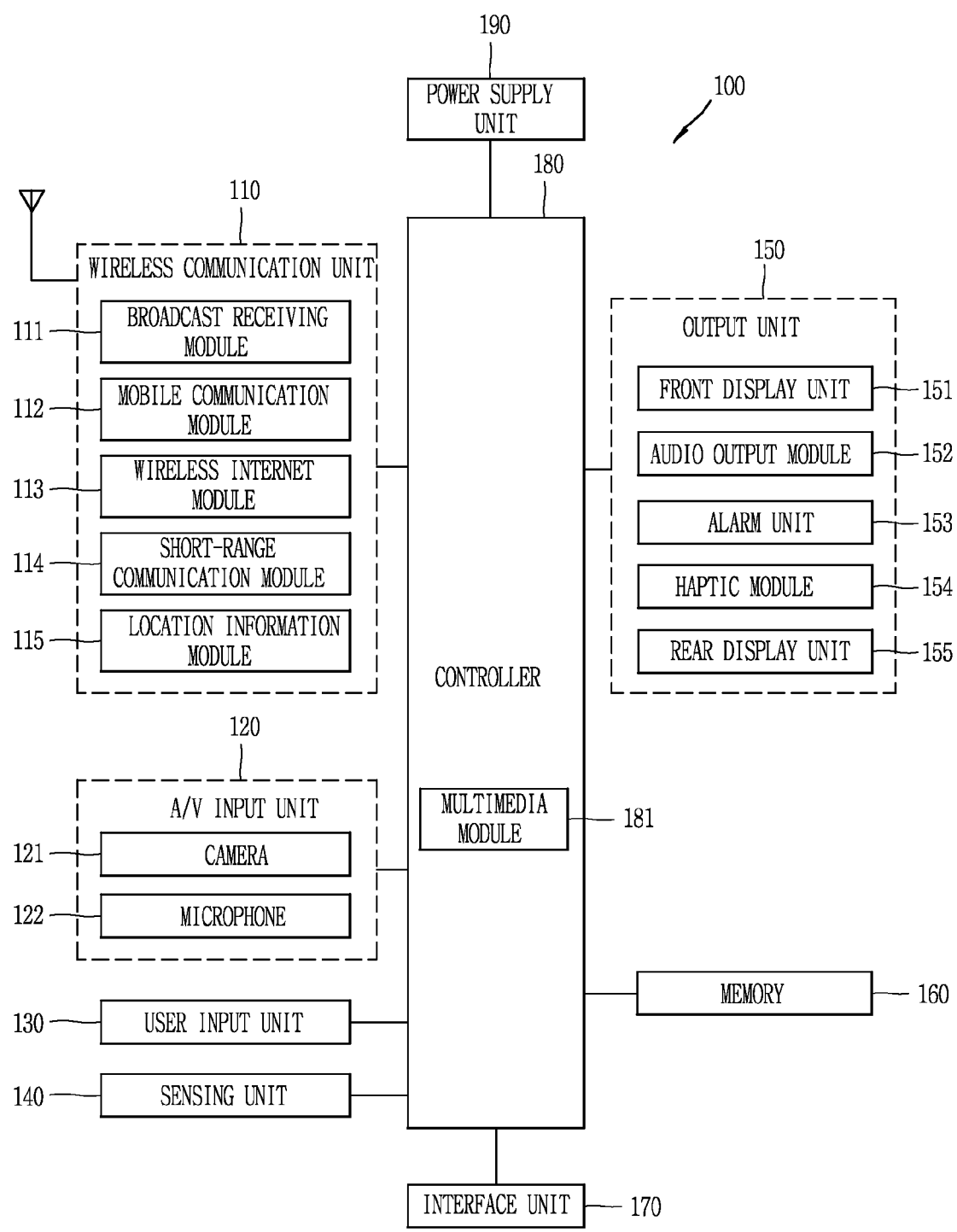
FIG. 1 is a block diagram illustrating a mobile terminal according to an embodiment disclosed in the present disclosure.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention.

While attached drawings have been used for describing exemplary embodiments of present disclosure for purpose of simplicity of explanation, it is not the intention of the applicant to restrict or in any way limit the scope of appended claims to such details. It will be apparent to one of ordinary kill in the art that the present invention may be practiced without these specific details. In other instances, well-known methods, procedures, components, circuits, and networks have not been described in detail so as not to unnecessarily obscure aspects of the embodiments.

The terms a or an, as used herein, are defined as one or more than one. The term plurality, as used herein, is defined as two or more. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The mobile terminal described herein includes a cellular phone, a smart phone, a laptop computer, digital broadcasting terminal, personal digital assistance (PDA), portable multimedia player (PMP), navigation, Slate PC, Tablet PC, Ultra book. However, except particular components of present disclosure that are only available for mobile terminal, It will be apparent to one of ordinary kill in the art that the present invention may be applicable to fixed terminal such as digital TV, a desktop computer.

FIG. 1 is a block diagram illustrating a mobile terminal 100 according to an embodiment disclosed in the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement an video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal 100, and there is a Global Positioning Module (GPS) module or Wireless Fidelity (WiFI) as a representative example.

Referring to FIG. 1, an audio/video (NV) input unit 120 is to receive an audio or video input signal, and includes a camera 121, a microphone 122, and so on. The camera 121 processes image frames of a still or a moving image, which comprises at least one captured object image corresponding to a respective captured object, from an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment.

The microphone 122 receives an external audio signal through a microphone in a phone call mode, a recording mode, a voice recognition mode, and the like, and processes the audio signal into electrical voice data. The microphone 122 process the external audio signal collected during video capture performed by a video capture mode. The processed data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the mobile terminal 100. The user input unit 130 may be configured by including a keypad, a dome switch, a touch pad (pressure/capacitance), a jog wheel, a jog switch, and the like.

The sensing unit 140 detects current operating status of the mobile terminal 100, including a location of the mobile terminal 100, a presence or absence of user contact with the mobile terminal 100, an orientation of the mobile terminal 100, an acceleration/deceleration of the mobile terminal 100, etc., so the sensing unit 140 generates a sensing signal for controlling the operation of the mobile terminal 100. For instance, the sensing unit 140 may sense the presence or absence of power provided by the power supply unit 190, the presence or absence of a coupling between the interface unit 170 and an external device.

The output unit 150 is configured to generate an output associated with visual sense, auditory sense or tactile sense, and may include a front display unit 151, an audio output module 152, an alarm unit 153, a haptic module 154, a rear display unit 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. The structure of the rear dies of the display unit 151 can also be configured with optical transparent type. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor may be arranged at an inner region of the mobile device 100 surrounded by the touch screen, or adjacent to the touch screen. The proximity sensor refers to a sensor to sense the presence or absence of an object approaching to a surface to be sensed, or an object disposed adjacent to a surface to be sensed, by using an electromagnetic field or infrared rays without a mechanical contact. The proximity sensor has a longer lifespan and a more enhanced utility than a contact sensor.

The proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

The audio output unit 152 may output audio data received from the wireless communication unit 110 or stored in the memory 160, in a call-receiving mode, a call-placing mode, a recording mode, a voice recognition mode, a broadcast reception mode, and so on. The audio output unit 152 may output audio signals relating to the functions performed in the mobile terminal 100 (e.g., sound alarming a call received or a message received, and so on). The audio output unit 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output unit 152 may be categorized into part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

The interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Hereinafter, a mobile terminal according to an embodiment of the present disclosure as illustrated in FIG. 1 or a mobile terminal disposed with the constituent elements of the mobile terminal or the structure of a mobile terminal will be described.

Figure 2A:
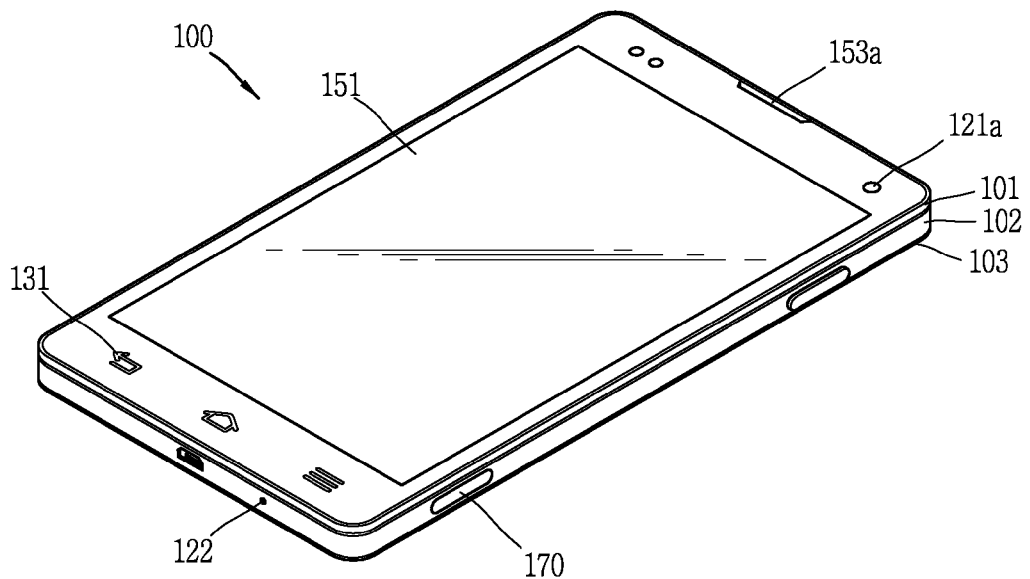
FIGS. 2A and 2B are front perspective views of a mobile terminal according to an embodiment disclosed in the present disclosure.
Figure 2B:
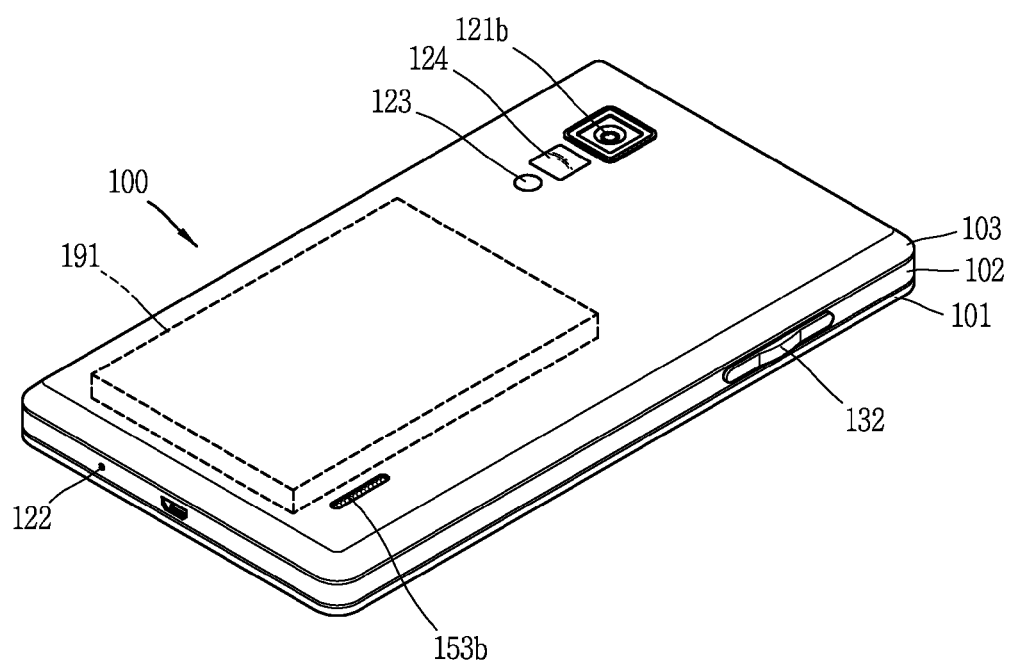

FIG. 2A is a front perspective view illustrating an example of the mobile terminal 100 associated with the present disclosure, and FIG. 2B is a rear perspective view illustrating mobile terminal 100 illustrated in FIG. 2A.

The mobile terminal 100 disclosed herein is provided with a bar-type terminal body. However, the present invention may not be limited to this, but also may be applicable to various structures such as slide type, folder type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102.

The cases may be formed by injection-molding a synthetic resin or may be also formed of a metal, for example, stainless steel (STS), titanium (Ti), or the like.

A display unit 151, an audio output unit 152, a camera 121, a user input unit 130 may be disposed at a front case 101 of the mobile terminal body.

The display unit 151 takes most portion of the front case 101. The audio output unit 152 and the camera 121 are disposed adjacent to either one of both ends of the display unit 151.

The display unit 151 is configured to display various kinds of visual information, such as text words, numbers, symbols, graphical objects, icons.

For inputting such information, at least one of the text words, numbers, symbols, graphical objects, icons may be arranged in a particular way, thereby forming a "a soft keyboard" (onscreen keyboard).

The display unit 151 may be operated while taking the entire region of the screen, or it may be divided into sub-regions. For the later case, those sub-regions are may electrically integrated to be operated.

The user input unit 130 is manipulated to receive a command for controlling the operation of the mobile terminal 100. The user input unit 130 may include a plurality of manipulation units 131, 132, 133.

Those manipulation units 131, 132, 133 may be commonly referred to as a manipulating portion, and any method may be employed if it is a tactile manner allowing the user to perform manipulation with a tactile feeling such as touch, push, scroll or the like.

The content through the first through third manipulation units 131, 132, 133 may be set in various ways. For example, the first manipulation unit 131 may be used to receive a command such as start, finish, scroll, and is located at the end portion of display unit 151, being opposed to the ends where the audio output unit is placed.

The manipulation units 132, 133 are configured to receive a command, such as controlling a volume level being outputted from the output unit 150 or switching into a touch recognition mode of the display unit 151.

With reference to FIGS. 1 and 2, at the one end of the mobile terminal wired/wireless headset ports 171 and wired/wireless data ports 172 may be mounted. Those ports 171, 172 are adopted to form an exemplary interface 170 of a mobile terminal.

Referring to FIG. 2B, a second camera 121b may be additionally mounted at a rear surface of the terminal body, namely, the rear case 102. The camera 121b has an image capturing direction, which is substantially opposite to the direction of a first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and pop-up enable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

An audio output unit 152 may be additionally disposed at a rear surface of the terminal body. The audio output unit 152 as well as the audio output unit 260 mounted on the front case (refer to FIG. 2A) can implement a stereo function, and may be also used to implement a speaker phone mode during a phone call.

An antenna (not shown) receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

With reference to the incorporated drawings, the mobile terminal may be equipped with diverse components, such as the microphone 122 and interface, etc. The microphone 122 may be located near the end of the mobile terminal body (the display unit), an opposing side from the other end where audio output unit is located.

The sides of front case 101 and rear case may accommodate a user input units 132, 133 and connection ports.

The connection port is configured to receive data, transferring the supplied power to sub-components of the mobile terminal, transmitting the data stored in the mobile terminal to external devices. And exemplary embodiments of the connection port may be an interface 170 (refer to FIG. 1).

A power supply unit 190 for supplying power to the mobile terminal 100 may be mounted on the terminal body. The power supply unit 190 may be incorporated into the terminal body, or may be configured to be detachable from the outside of the terminal body.

Hereinafter, according to one embodiment of the present disclosure, illustrative methods to operate a mobile terminal will be explained.

Figure 3:
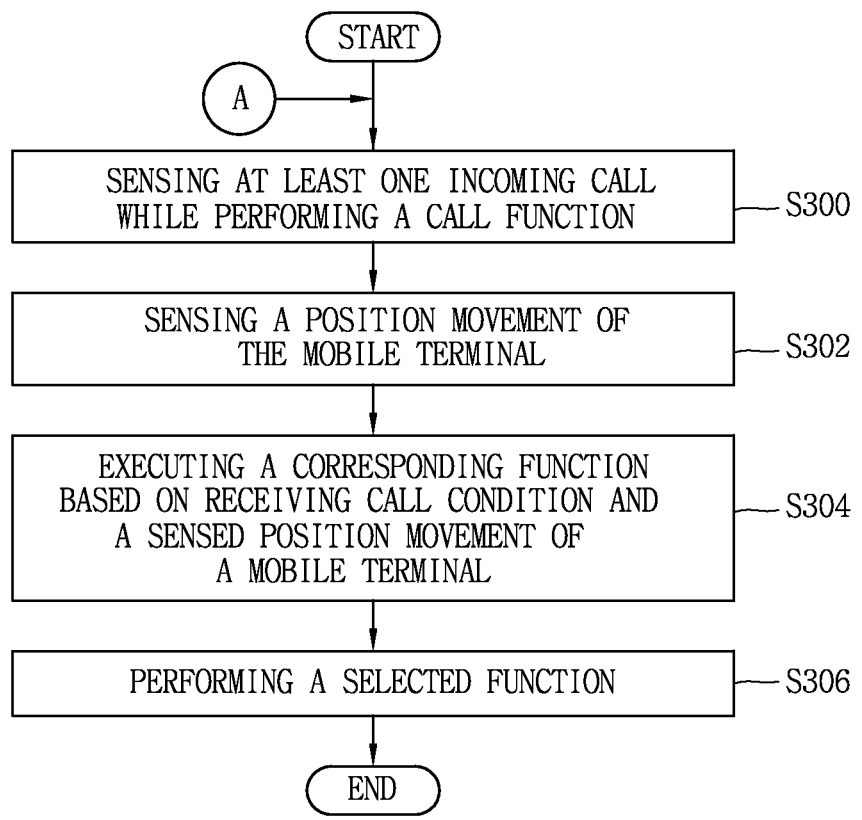
FIG. 3 is a flow chart showing an operation of a mobile terminal according to an embodiment disclosed in the present disclosure.

FIG. 3 is a flow chart showing operation of a mobile terminal according to one embodiment of the present disclosure.

First of all, a controller 180 of a mobile terminal 100 is configured to sense a state of a call function of a mobile terminal 100 or a state of receiving a different incoming call while performing the call function in step 300.

Here, in response to sensing an arrival of an incoming call or receiving a incoming call, the call function may be a function of controller 180 enabling a user to make a conversation with a counterpart of the call by communication with more than one external device. Also, the call function may be a function activating data communication though an external server such as a cloud server. However, hereinafter, for the convenience of explanation, the call function will be assumed as a function enabling a user to make a call conversation with a counterpart in a call.

Hence, "state of performing a call function" may refer to a state where a user conducts a call conversation using the mobile terminal 100. Furthermore, the controller 180 may further sense receiving call state change while a mobile terminal 100 is performing a call function in step 300. For example, the step 300 may be a stage wherein, while a call function is being implemented, a controller 180 may sense whether the current call still continues or another different incoming call has been received. On the other hand, in response to receiving at least one different incoming call, the step 300 may be the stage to determine whether the received call is one call or more than two calls.

Also, in response to receiving a different call based upon sensing result in step 300, the step 300 may further comprise the process to alert the arrival to the user. For example, in repose to receiving a different call while the mobile terminal is processing a call, the controller 180 may notify the receipt of the different call to a phone user by generating voice signal, bell sounding, or acoustic signal in step 300.

In response to sensing that a phone call has been received in step 300, the controller 180 may then sense a position movement of the mobile terminal 100 in step 302. Here, the position movement of the mobile terminal 100 may be sensed through diverse methods.

For example, a position movement of mobile terminal 100 may be sensed by more than one sensor incorporated into the sensing unit 140. For example, the sensing unit 140 may include a gyro sensor, an acceleration sensor, an inertia sensor, thereby determining whether a position movement reaching or exceeding a predefined threshold movement has been occurred.

Also, a position movement of the mobile device 100 may be sensed based on sensing a user's gesture to move the mobile terminal 100. Here, a phone user's gesture to move the mobile terminal 100 may be the user's motion such as changing the gripping position of the mobile terminal 100 while keeping it in the user's hand.

The controller 180 may also sense a position movement of the mobile terminal 100 based on sensing results of a user's ear. For example, the controller 180 may sense a phone user's ear, and then compares the sensed results with a prestored user's ear recognition information to determine, and therefore it can determine whether the sensed ear is a right or left ear of the user. Also, the controller 180 may determine that the mobile terminal 100 has made its position movement in response to when the sensed user's ear has subsequently been changed from one ear to the other ear of a user.

Regarding the methods to move a mobile terminal 100 will be explained in details with reference to FIGS. 4 and 5.

On the other hand, in response to a sensing a movement of a mobile terminal based upon sensed results in step 302, the control 180 may then execute a corresponding function in step 304 based on the receiving call state sensed in step 300 and the position movement of mobile terminal sensed in step 302.

Here, the function corresponding to the call receiving state and sensed position movement results may be a function associated with the current operation state of the mobile terminal 100, i.e., conducting the call function. For example, the corresponding function may be a function related to the call function, i.e., a function to record conversation of a currently connected call, or a function, in response to when a different incoming call has been received, for switching to counterpart of the different incoming call from a currently connected call, a function to perform a group call in response to when more than two calls are received, etc.

For example, the controller 180, in response to sensing a position movement of the mobile terminal 100—when the mobile terminal 100 has moved from a position adjacent to an ear of a user to a position adjacent to other ear of the user—may select one function from those available functions based on the mobile terminal 100's current call receiving state.

In other words, in response to sensing no arrival of incoming call while the mobile terminal 100 is processing a call, the controller 180 may select a function to record the current call conversation. Also, in response to sensing an arrival of incoming call while the mobile terminal 100 is processing a call, the controller 180 may switch to a party of the incoming call from a party of current call. Also, in response to sensing arrival of more than two incoming calls, the controller 100 may select a function to execute a group call based on a sensed position movement of the mobile terminal 100.

Then, the controller 180 may perform a function selected in step 304 in step 306. The exemplary cases to explain how the corresponding function is selected and performed in response to a call receiving state and a sensed position movement of the mobile terminal will be described in detail with reference to following FIGS. 6, 9, and 11.

According to one embodiment of the present disclosure, the mobile terminal 100, while performing the call function, may execute corresponding function, i.e., a function related to call function based on a position movement of the mobile terminal 100. As such, as one embodiment of the present disclosure, the mobile terminal 100 may perform diverse functions without the need of a user's touch input, such as switching a call counterpart, recording a call conversation, or performing a group call.

Even if the following detailed description refers a call function as a phone function, it is readily clear that the referring is not to limit the scope of present invention. In other words, the present invention is also applicable a data communication between a mobile terminal and any accessed external servers coupled to the mobile terminal.

The aforementioned description has described that the mobile terminal is configured to determine its position movement by sensing a user's gesture as one embodiment of the present disclosure.

Figure 4:
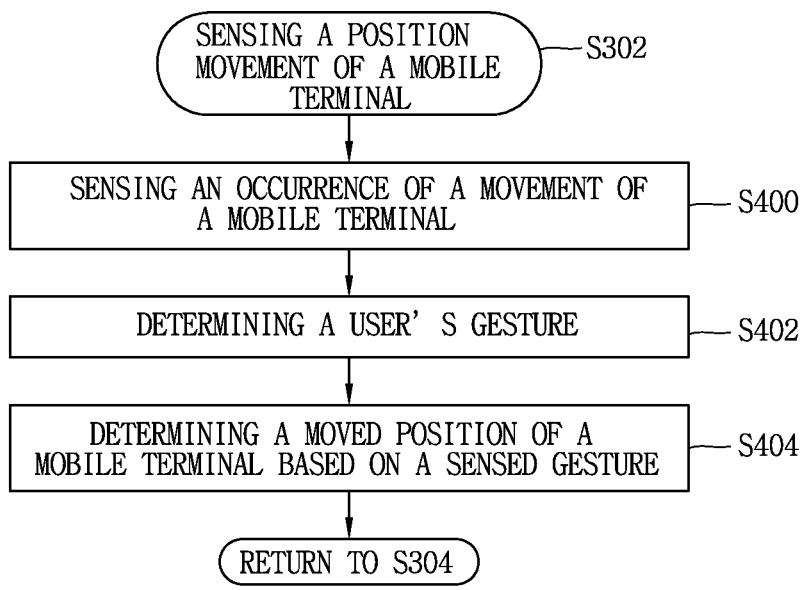
FIG. 4 is a flow chart explaining a mobile terminal operation to sense a position movement according to an embodiment disclosed in the present disclosure.

FIG. 4 is a flow chart explaining a mobile terminal operation to sense a position movement based on sensing a phone user's gesture according to one embodiment of the present disclosure.

With reference to FIG. 4, as one embodiment of the present disclosure, the controller 180 of the mobile terminal 100, in response to sensing arrival of incoming call in step 300, may sense whether a mobile terminal 100 has made any position movement in step 400.

For example, in response to when the mobile terminal 100 has made any position movement, the controller 180 may sense the movement through a gyro sensor, an acceleration sensor, an inertial sensor, etc, which are disposed at a sensor unit 140. For example, the controller 180 may determine that the mobile terminal 100 has made a position movement in response to sensing the presence of variations (changes) of measurements of the sensors or when such variations (changes) has reached or exceeded a preset reference range.

Also, the controller 180 may sense a movement of mobile terminal 100 through an ambient light sensor or a proximity sensor. For example, in response to when sensed intensity of illumination has failed to reach a preset reference range, the controller 180 may determine that the mobile terminal 100 has been put into a position adjacent to an ear of a phone user. On the other hand, in response to when sensed intensity of illumination has exceeded a preset reference range, the controller 180 may determine that the mobile terminal 100 has been moved more than a predefined distance from the user.

In addition to sensors disposed at the sensor unit 140, the controller 180 may sense a movement of mobile terminal 100 using an image captured by a camera 121. For example, the controller 180 may sense a movement of mobile terminal 100 based upon changes of images captured by the camera 121. For example, the controller 180 may determine a position movement of the mobile terminal in response to when the varying degree of the captured image has reached or exceeded a preset reference range.

Also, the controller 180, upon sensing that a size of a captured image from a camera 121 has expanded to a certain degree level, may determine that the mobile terminal 100 has made a position movement further close to an ear of a user. On the other hand, in response to sensing that the size of the captured image has reduced to a certain degree level, the controller 180 may then determine that the mobile terminal 100 has further distanced from the user.

Also, the controller 180 may determine whether the mobile terminal 100 has made a position movement based on whether a camera 121 has received an ear image from a user. For example, in response to when the camera 121 has captured an ear of a user, the controller 180 may determine that the user becomes located within a preset distance. On the other hand, in response to when the ear of the user cannot be captured, the controller 180 may determine that the user becomes distanced beyond the preset distance Also, the controller 180, in response to when coming to receive a different image departed from a user's ear image that has been captured by a camera 121, may determine a position movement of a mobile terminal 100.

On the other hand, in response to sensing a movement of the mobile terminal 100 with such method in step 400, the controller 180 may determine the user's gesture, and then determine a moved position of a mobile terminal 100 based upon the determined user's gesture in step 404.

For example, the controller 180 may determine whether a user makes a predefined gesture by comparing a measurement obtained by diverse sensors-such as a gyro sensor, an acceleration sensor, an inertial sensor—with a threshold value prestored in a memory unit 160.

In other words, a user can register a motion to move the mobile terminal 100 as a kind of gesture. For example, when a user has grabbed a mobile terminal 100 in the user's hand and then moves the mobile terminal 100, sensors of a sensing unit 140 may sense the movement state of mobile terminal 100. Also, measurements sensed by the sensors may be stored into the memory unit 160 as user gesture information.

Since then, when a user has moved his or her hand holding the mobile terminal 100, the controller 180 may sense the movement of the mobile terminal 100 in step 400, and then compare sensed measurements from each sensor with the user gesture information stored in the memory unit 160 by proceeding to step 402. Based upon this, the controller 180 can determine whether a user has made a preset gesture (a registered gesture) in step 402.

Also, the controller 180 may determine a currently moved position of the mobile terminal 100 based on the determined gesture in step 404. In other words, in response to when a sensed gesture has been found to be a user's gesture moving a mobile terminal 100 from one ear to the other ear of a user, the controller 180 may determine that the mobile terminal 100 has been moved from one ear to the other ear of the user.

Also, when the mobile terminal 100 has been moved from one ear to the other ear of a user, the controller 180 may select a corresponding function based on a sensed movement of the mobile terminal 100 by proceeding to step 304. For example, the controller 180, based on a gesture, i.e., a gesture moving the mobile terminal from one ear to the other ear of the user, can select a function, such as switching a call counterpart or a call recording in the step 304.

On the other hand, in order to sense a movement of a mobile terminal 100, diverse methods may be used other than using a user gesture as discussed above. For example, a mobile terminal 100 may sense a movement of the mobile terminal based on whether a sensed ear of a user has been changed to the other ear of the user after having sensed an ear of the user according to one embodiment of the present disclosure.

Figure 5:
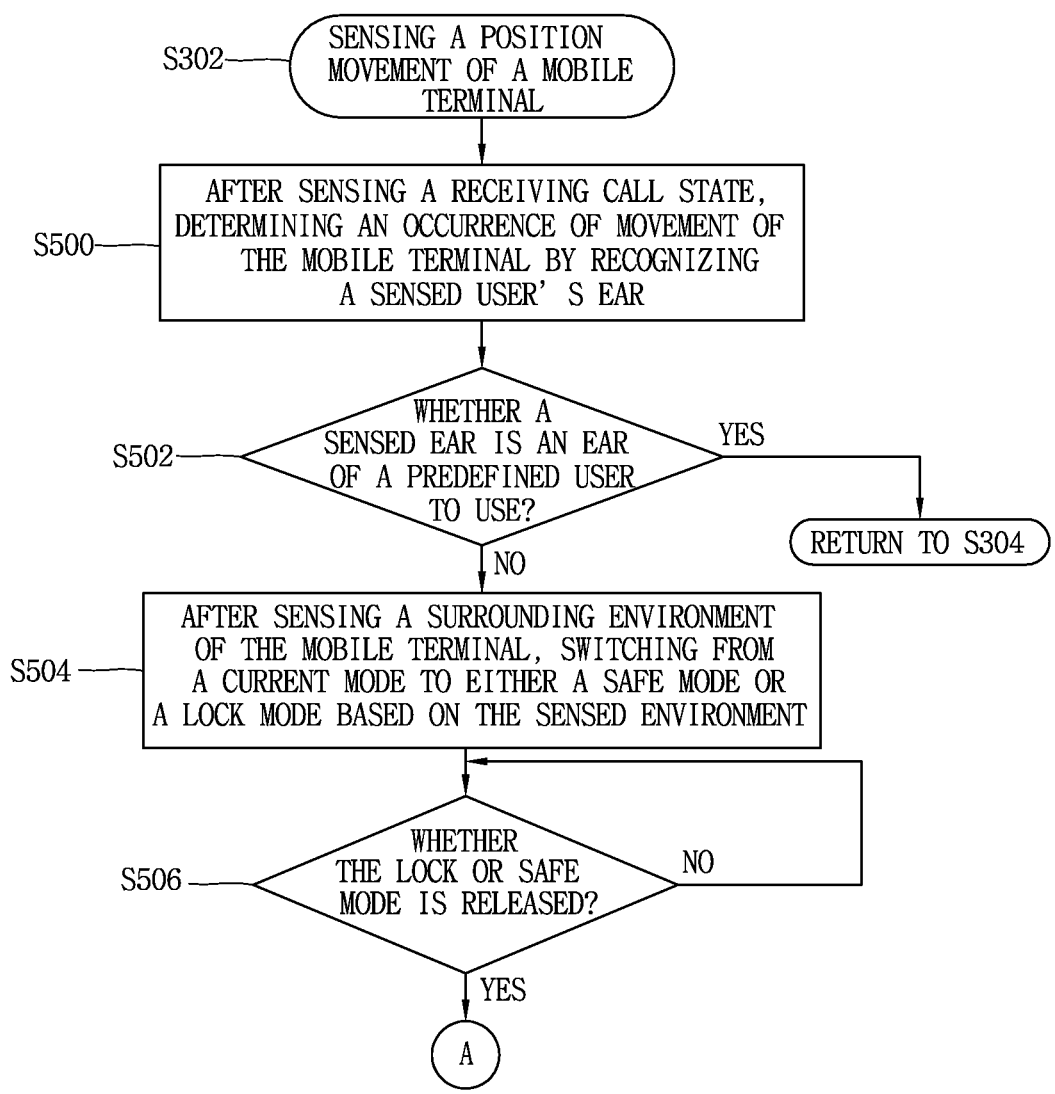
FIG. 5 is an operation flow chart for further explaining a mobile terminal to sense its position movement according to an embodiment disclosed in the present disclosure.

FIG. 5 is a flow chart for detail explanation of different mobile terminal operations to sense a position movement according to one embodiment of the present disclosure.

With reference to FIG. 5, according to the exemplary embodiment of the present disclosure, the controller 180 of the mobile terminal 100, after having sensed a receiving call state in step 300, senses a user's ear and then determines an occurrence of a movement of the mobile terminal 100 by recognizing the sensed user's ear in step 500.

In the step 500, the controller 180 may have diverse methods to sense a user's ear. For example, the controller 180 may determine an occurrence of movement of the mobile terminal 100 by comparing a captured user's ear image sent from the camera 121.

As one example, it can be assumed that a user has been putting a mobile terminal 100 into a position adjacent to the user's right ear while conducting a call, and then moves the mobile terminal 100 to a position adjacent to the user's left ear after a certain period of time. In this case, the controller 180, in response to sensing such movement of the mobile terminal 100, may receive a captured user's ear image pressed to (or placed to a adjacent position to) the right ear from a camera 121, and then compare the received ear image with a prestored ear image in a memory unit 160. And based on such comparison, the controller 180 may determine that the mobile terminal 100 has been moved from a location pressing against the user's right ear (or a adjacent position to the user's right ear) to other location pressing against the user's left ear (or a adjacent position to the user's left ear).

In other words, the controller 180 may extract a critical profile from a user's ear image from a camera 121, and then compare the extracted critical ear profile with a prestored ear profile from the memory unit 160, thereby determining whether a person currently using the mobile terminal is an authorized user and a user's ear to which a user has closely put the mobile terminal 100.

Also, the controller 180 may determine a movement of the mobile terminal 100 using a sensed shape of a user ear through a touch sensor. For example, the controller 180 may recognize a shape of a user ear that has been placed in close proximity to a touch screen (e.g., display unit 151). By comparing a sensed shape of a user ear with a pre-stored shape of a user ear from a memory unit 160, the controller 180 may determine whether a user's ear pressed to the touch screen is a right ear or left ear of the user. Also, the controller 180 may determine that the mobile terminal has been moved in response to when an ear pressed against a touch screen has been changed based on the ear shape of a user sensed by a touch screen.

Also, the controller 180, upon determining that the mobile terminal 100 has been moved from a vicinity to an ear to a vicinity to the other ear of the user based on a comparison result of a user's ear shape, may select a function corresponding to a sensed movement of the mobile terminal 100 by proceeding to the step 304. For example, the controller 180 may select a corresponding function based on sensed movement of the mobile terminal 100, such as switching a call counterpart or recording a call conversation in step 304.

Herein, the controller 180 may also determine that a recognized ear by a camera 121 or a touch screen is not an ear of an authorized user. For example, it may be assumed when a user has handed a mobile terminal 100 to another person or when the mobile terminal 100 has been robbed or stolen by the other person.

Under those circumstances, when a person who has obtained the mobile terminal 100 attempts to use it, the controller 180 of the mobile terminal 100 senses the person's ear through the touch screen in step 500, and verifies whether a sensed ear is an ear of predefined user in step 502.

Also, in step 502, when the sensed ear is found to be the ear of the predefined user, the controller 180 advances to the step 304 and then select a function corresponding to a position movement of the mobile terminal 100. However, if the sensed ear is found to be not an ear of a predefined user, the controller 180 may switch from a current mode to either a safe mode limiting certain available functions or a lock mode limiting all available functions in step 504.

Here, the controller 180 may use sensed surrounding circumstances of the mobile terminal 100 to select the either one of the safe mode or the lock mode. For example, the controller 180, based on the sensed surrounding circumstance of the mobile terminal 100, may determine whether the mobile terminal 100 has been stole or whether it has been voluntarily handed to the other person.

In other words, the controller 180 may sense dramatic changes of the circumstances surrounding the mobile terminal 100 using sensors disposed within a sensing unit 140. Here, the dramatic changes refers to a change, such as when a loud sound, exceeding a preset reference volume level, is generated, when the mobile terminal 100 has been moved further than a preset reference distance (or an accelerated moving), or when excessive pressure, exceeding a preset reference pressure level, has been applied to the mobile terminal 100.

Subsequently upon sensing any one of those changes, the controller 180 may determine that the mobile terminal 100 has been robbed by the other person. And, based upon determination that the mobile terminal 100 has been robbed, the controller 180 may switch from an operation mode to the lock mode.

On the other hand, in response to when a sensed change level of the surrounding circumstance of the mobile terminal 100 has been staying below a preset reference range, the controller 180 may determine that the mobile terminal has been voluntarily handed to the other person. Under this circumstance, the controller 180 may switch to a safe mode from an operation mode so as to limit using certain available functions. As one example, the safe mode may be the mode disabling receiving an incoming call. As another example, under the safe mode, when a mobile terminal performs a call function (i.e., during a phone call), a microphone function may be disabled such that a user only hear the voice from a counterpart of a call while not being able to transmit his or her voice to the call counterpart.

Once switching to the lock or safe mode has been made, the controller 180 will keep a current mode until a user provides an input to release those modes in step 506.

Here, user inputs to unlock the lock mode can be diverse. For example, to unlock the lock mode a user is allowed to enter a preset pattern on the touch screen of the mobile terminal 100 or enter a preset password (encryption code).

Also, a sensed user's ear image may be used again to release the lock mode. For example, once an operation mode has been switched to the lock mode, the controller 180 may resume sensing an ear of a user who is currently using the mobile terminal 100. Then, if a prestored user's ear recognition information matching the re-sensed result is found, the controller 180 may determine that the mobile terminal 100 has been returned to an owner of the mobile terminal 100. Accordingly, the controller 180 may then release the lock mode. In this case, by proceeding to the step 300, the controller 180 may monitor a state of the mobile terminal 100 executing a call function and a call receiving state while the call function has been performed.

On the other hand, once the unlock mode or the safe mode has become released, the control 180 may switch from a current mode to a particular operation mode. The particular operation mode, for example, may be an operation mode not limiting available functions. In other words, in response to when the lock or the safe mode comes to be released, the controller 180 may switch to an operation mode having no functional restrictions, so a user is allowed to use all available functions of the mobile terminal 100.

On the other hand, the particular operation mode may be a preset operation mode to execute a particular function. The particular function mode, for example, may be an operation mode to display those information elements-operation history of a user's attempts using the mobile terminal 100 since the safe or lock mode has been enabled, e.g., the number of a user attempts to unlock the safe or lock mode, the captured images by the camera 121 showing a user's attempts to unlock the lock or safe mode, etc—on the display unit 151.

Also, the particular operation mode may be an operation mode offered just before switching to the lock or safe mode. The controller 180, for example, may record the state—when switching to the lock or safe mode was made—as history information. Then, in response to when the lock or safe mode becomes released, the controller 180 may retrieve an operation mode offered just before switching to either the lock mode or safe mode using the history information.

As described in the foregoing, the operation flow of the mobile terminal according to the present disclosure has been explained. Hereinafter, with reference to the incorporated drawings, there will be detail explanation on the process by which corresponding functions are selected and processed based on a call receiving state or sensed position movement according to the described operation flow.

The controller 180 of the mobile terminal 100 may execute diverse operational functions based on a movement of the mobile terminal 100 according to one embodiment of the present disclosure. For example, based on a movement of the mobile terminal 100, the controller 180 may switch a call counterpart, record the telephone call, or execute a group call.

Figure 6:
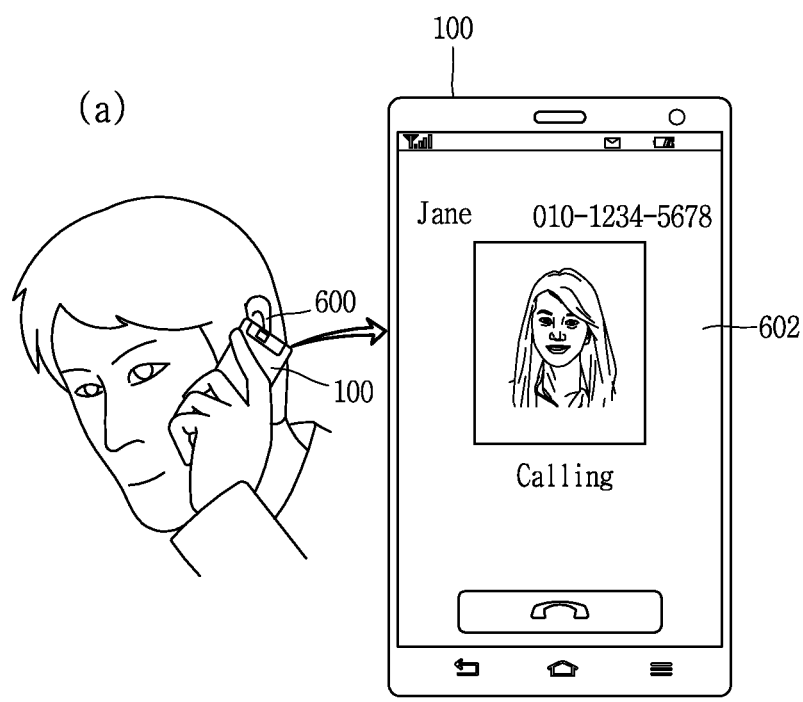
FIG. 6 is a conceptual view illustrating an exemplary operational control method according to FIG. 3.
Figure 6:
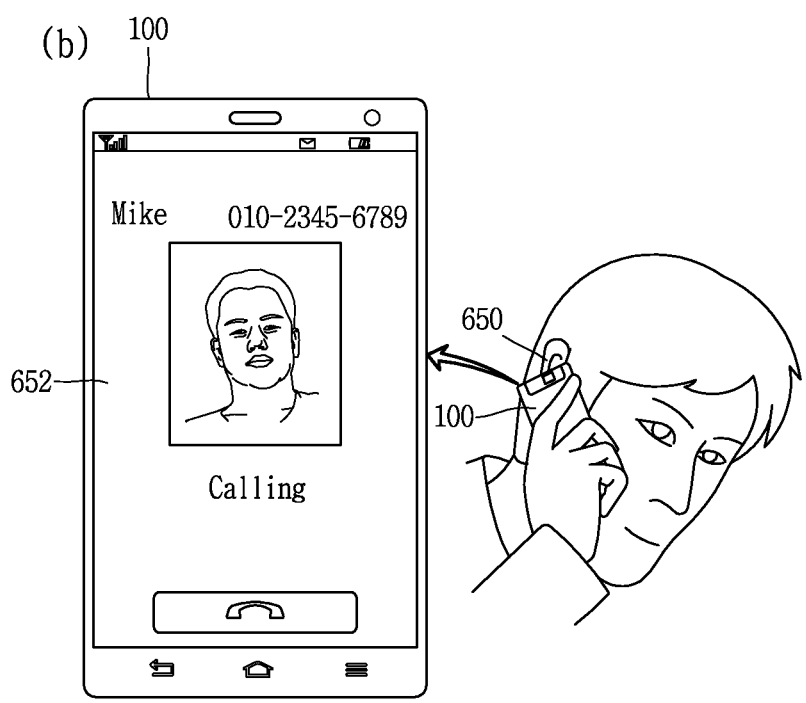

FIG. 6 is a conceptual view illustrated switching of a call counterpart as an exemplary control method according to FIG. 3.

With reference to FIG. 6, FIG. 6A illustrates a mobile terminal 100 processing a call conversation between a phone user and with a call counterpart 602 using a connected call. As shown in FIG. 6A, let's assume that a user is conducing a call while putting a mobile terminal a position adjacent to his or her left ear 600.

While performing a call function, the controller 180 may sense an arrival of other incoming call in step 300. Subsequently, in response to when an incoming call has been sensed, the controller 180 may then notify a user of the arrival of the incoming call.

Figure 7:
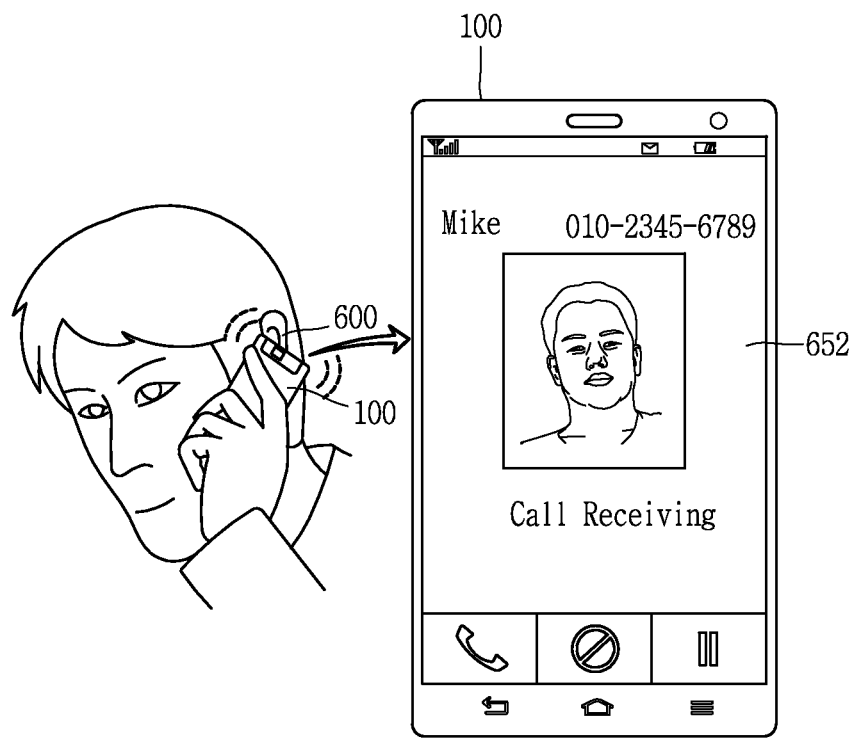
FIG. 7 illustrates an exemplary operation of a mobile terminal receiving incoming calls while performing a call function according to an embodiment disclosed in the present disclosure.

FIG. 7 illustrates an exemplary case when an arrival of an incoming call is sensed while a mobile terminal 100 has been performing a call function according to one embodiment of the present disclosure.

For example, in response to sensing arrival of an incoming call while the mobile terminal 100 has been performing a call function, the controller 180 may notify the arrival of an incoming call to a user through vibrations, a bell sound, a voice message, etc. as shown in FIG. 7.

For example, caller information may be provided (generated) in a form of the sound transmission such as a text-to-speech (TTS) signal, so a user need not visually check the caller information. Upon sensing an arrival of a new incoming call, the sound signal may be automatically outputted, or it may be outputted corresponding to a preset key input or a preset gesture input depending on the user's selection.

Subsequently, the controller 180 may then switch a call counterpart based on a user's selection, and then processing a call with a caller who has triggered the sounding signal. Here, the controller 180, after having notified the arrival of incoming call to the user, may switch a call counterpart only if the user's corresponding selection is made within a preset time period.

The user's selection may be determined based on a sensed position movement of the mobile terminal 100. For example, in response to when a user puts the mobile terminal 100 from a position adjacent to an ear of the user to a position adjacent to the other ear of the user, the controller 180 may determine that the user has selected switching a call counterpart.

Accordingly, as shown in FIG. 6B, in response to when the mobile terminal 100 has been moved from a position adjacent to a left ear of a user to a position adjacent to a right ear of the user, the controller 180 may determine that the user has selected switching of a call counterpart. Accordingly, the controller 180 may enable a phone conversation with a new call counterpart by connecting a phone line to a party of a newly arrived incoming call based on the reorganized user's selection.

Also, in response to a switch of a call counterpart, the controller 180 may inform the switch to the user. For example, the controller 180 may notify the switching of a call counterpart through a voice signal or vibration signal.

Also, the controller 180, after sensing a movement of the mobile terminal 100, and when it determines that a user has selected the switching of a call counterpart, may notify an imminent a call counterpart switching through a voice signal or vibration signal to a user. And then, the controller 180 may perform the switching the counterpart of the call after a preset time has lapsed.

In this case, in response to when the switching of a call counterpart has accidentally been made, a user may rectify the switching by entering a preset key or preset gesture. For example, to prevent the accidental switching a counterpart of a call, a user may rotate back the mobile terminal 100 to a previous position where the mobile terminal 100 is used to be positioned before the switching: the position adjacent to the ear of the user before the switching. Thereafter, the controller 180, in response to when a position movement of the mobile terminal 100 is sensed again within a preset time period, may not perform a switching a counterpart of a call depending on a user's gesture or recognized ear results.

Like this case, the mobile terminal 100, as one embodiment of the present disclosure, may switch a call counterpart simply sensing a user gesture in response to when sensing an arrival of an incoming call while performing the call function. Accordingly, without a touch input, the mobile terminal 100 may switch a counterpart of a call as one embodiment of the present disclosure.

On the other hand, as shown in FIG. 6, in response to when a call counterpart becomes switched, the switching may be recorded in a call detail record.

Figure 8:
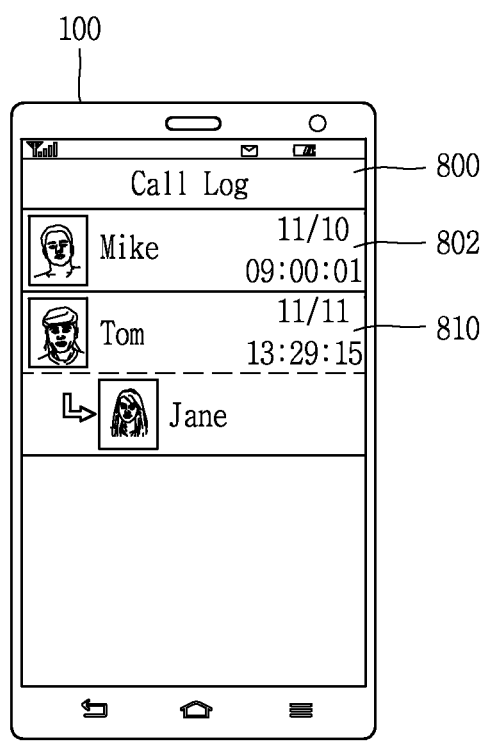
FIG. 8 illustrates an exemplary mobile terminal displaying a call log in response to switching of a call counterpart according to an embodiment disclosed in the present disclosure.

FIG. 8 illustrates an exemplary call log displayed in response to when the switching of a call counterpart is made according to one embodiment of the present disclosure.

As shown in FIG. 8, the controller 180 of the mobile terminal 100 may display a call log 800 at least one portion of the display unit 151 in response to when a user has requested the call log according to one embodiment of the present disclosure. Also, the call log 800 may include information about switched call counterparts.

For example, when a second call becomes connected by a call switching while a first call has been connected, the controller 180 may display a call log of the second call 810 in a call log of the first call 802 on the display unit 151 in response to a request for a call log of the first call as shown in FIG. 8.

Here, although the FIG. 8 merely has shown one switch of call counterpart, the controller 180 may include a plurality of call logs belonging to a plurality of switched call counterparts within a call log 802 in response to when a plurality of switches of call counterparts have been made. Also, the controller 180, in response to when a user has selected a call log 810 of a switched call counterpart, may display the details of a switched call counterpart, i.e., a phone number, address, pre-stored personal information of the parties, the time when the switching was made, duration of time the switching has lasted, etc. at display unit 151.

At the aforementioned description, the controller 180 is assumed to switch a call counterpart in response to a movement of the mobile terminal 100 after sensing an arrival of an incoming call. However, a user, of course, is also free not to select switching a call counterpart.

For example, even when an arrival of an incoming call is sensed while a user has been conducting a first call, a user can continue conducting the first call. In this case, the controller 180, after having notified the arrival of the incoming call through a voice signal, vibration signal, or preset bell sound, may determine that the user does not select the switching of a call counterpart in response to when the mobile terminal 100 has not made any movement during a preset time period.

In this case, in response to when the incoming caller has been placed on hold, the controller 180 may establish a call connection (thereafter named as "a second call") between a user and the incoming caller once the first call is terminated. Also, if a waiting status of the second call is terminated earlier than that of the first call, the controller 180 may immediately make a call to a counterpart of the second call based on a user's corresponding selection.

Here, in response to when the mobile terminal 100 has not moved over a present time period, the controller 180 may determine that the user has not selected a switching of a call counterpart and notify this to a party of the second call through a preset voice message.

Contrary to the former case, in response to when call counterparts have been switched, the controller 180 may monitor connection state of the first call after finishing the conversation with a party of the second call. Then, in response to finding that the party of the first call is still on hold, the controller 180 may resume a call to the party of the first call by developing a necessary connection. On the other hand, in response to when the party of the first call has hung up the phone, the controller 180 may initiate connecting the party of the first call according to the user's selection.

Also, the controller 180 may provide information of a waiting calling party or a party of terminated call during switching of call counterparts to a phone user. For example, in response to when a first call—the call a user has engaged—continues, the controller 180 can generate an alert notifying a state of a counterpart of the second call: waiting or termination status. Also, in response to when the second call becomes connected to the user through a call switching, an alert signal notifying a waiting or termination status of the first call may be generated.

Here, the alerting information may be a visual signal displayed on display unit 151 or audio signal transmitted through the audio output unit 152. Also, the alerting information may be generated as a vibration signal having a preset oscillation pattern. Also, such alerting information may be generated together with the call information indicating a current call counterpart.

At the aforementioned description, in response to sensing a new incoming call while a mobile terminal 100 has been performing a call function, the controller 180 can perform a switching of call counterpart based on a sensed position movement of the mobile terminal 100. However, if none of incoming calls is received during the call function, the controller 180 may perform different functions, such as recording a conversation of the current call based on a position movement of the mobile terminal 100.

In this case, since this method does not need touch inputs, it may prevent the case where a user misses an opportunity to record the conversation of the call due to the amount of spending time to select (touch) a recording function.

Figure 9:
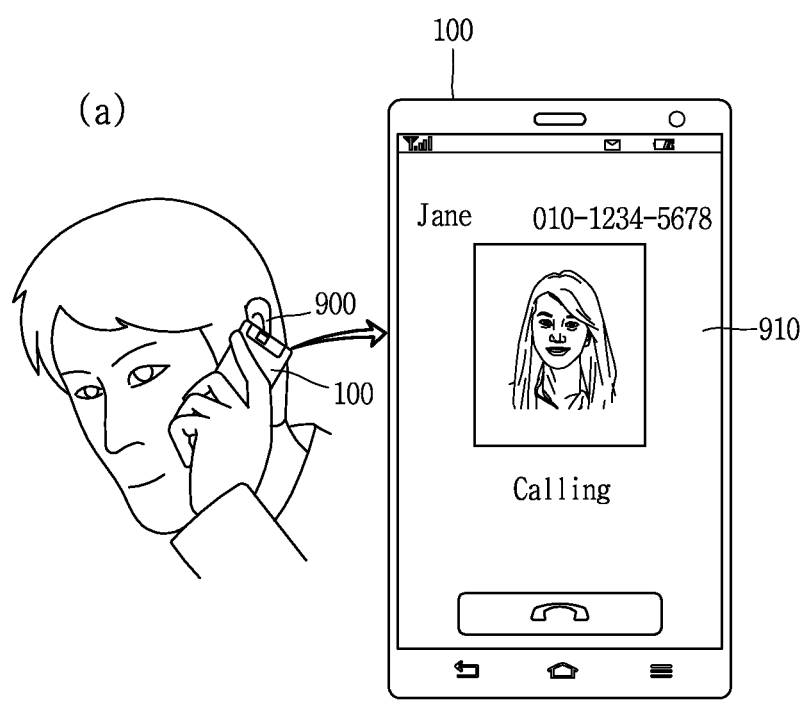
FIG. 9 illustrate exemplary method of a mobile terminal executing functions associated with a call function based on a sensed position movement of a mobile terminal according to an embodiment disclosed in the present disclosure.
Figure 9:
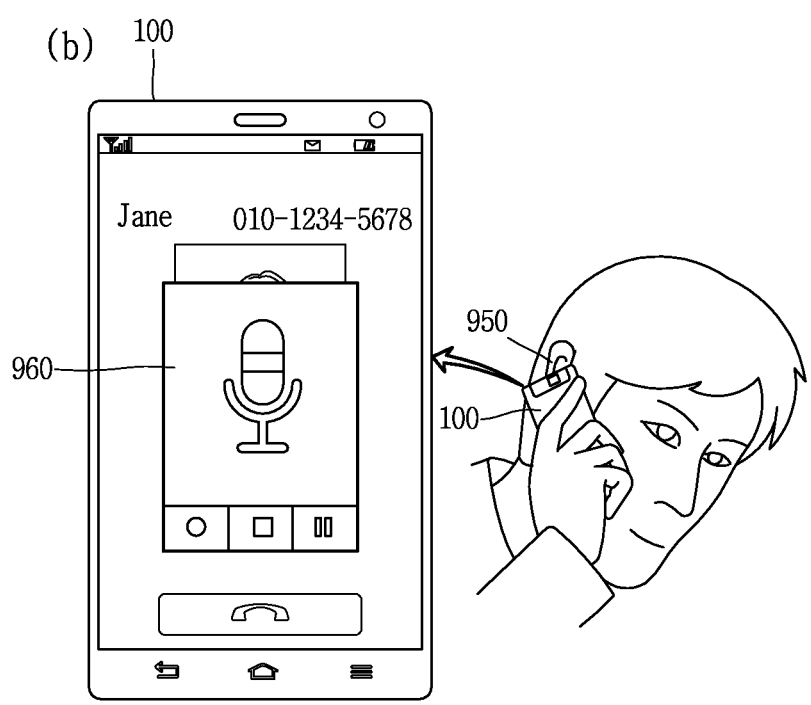

FIG. 9 illustrates exemplary methods of a mobile terminal executing functions associated with a call function based on sensed result of a position movement according to one embodiment of the present disclosure.

With reference to FIG. 9, FIG. 9A illustrates the case where a call event is made through setting up a call line to a call counterpart 910 using the mobile terminal 100. Also, as shown in FIG. 9A, it is assumed that a phone user has placed the mobile terminal 100 on his or her left ear during conducting a call.

Like this, while conducting a call function, the controller 180 may sense an arrival of an incoming call in step 300. Also, the controller 180, as shown in FIG. 9B, may sense a position movement of the mobile terminal 100, such as the mobile terminal's moving from a position adjacent to a left ear 900 of a user to a position adjacent to a right ear 950 of the user.

Also, in response to when the mobile terminal is moved while the arrival of an incoming call has not been sensed based on sensed results in step 300, the controller 180 may execute functions corresponding to the movement. Furthermore, as early described, even if no incoming call is sensed, a function associated with the call function may be selected and implemented corresponding to a position movement of the mobile terminal 100.

For example, the selected function may be based on the current operation state of the mobile terminal 100. Therefore, if the mobile terminal 100 performs a call function, the function corresponding to a position movement of a mobile terminal 100 may be recording the conversation of a current call.

In this case, when no additional incoming call is sensed as shown in FIG. 9B, the controller 180, in response to when a position movement of the mobile terminal 100, i.e., a position movement of a mobile terminal 100 from a position adjacent to an ear of a user to a position adjacent to a position adjacent to the other ear of the user, may process a function to record conversation of a call as shown in FIG. 9B. Also, as shown in FIG. 9B, the controller 180 may alert the beginning of recording of conversation of the call to a phone user through at least one of those methods: image information 960 displayed on display unit 151, vibrations, voice message, audible signal (a preset bell sound), etc.

On the other hand, activation and termination of a call recording can be processed in a similar way. For example, in response to when the mobile terminal 100 has moved from the vicinity of an ear of a user to the vicinity of the other ear of the user while a call is being recorded, the controller 180 may sense that the user has selected to terminate the recording of the call. In this case, the controller 180 may store the recorded call and stop recording.

Therefore, a user may immediately record the conversation of the current call by simply putting the mobile terminal 100 to a position adjacent to the other ear of the user. In this way, once the user does not need entering a touch input, the conversation may be recorded without assuming a risk of losing critical information. Also, the beginning and stopping of call recording can be repeated at any time by simply repeating a position movement of mobile terminal 100.

Once the call has been recorded in such way, the controller 180 may display the information associated with the recorded conversation on a display unit 151. Also, while displaying call logs on a display unit 151, the controller 180 may distinguish the call log of a recorded call from other call logs.

Figure 10A:
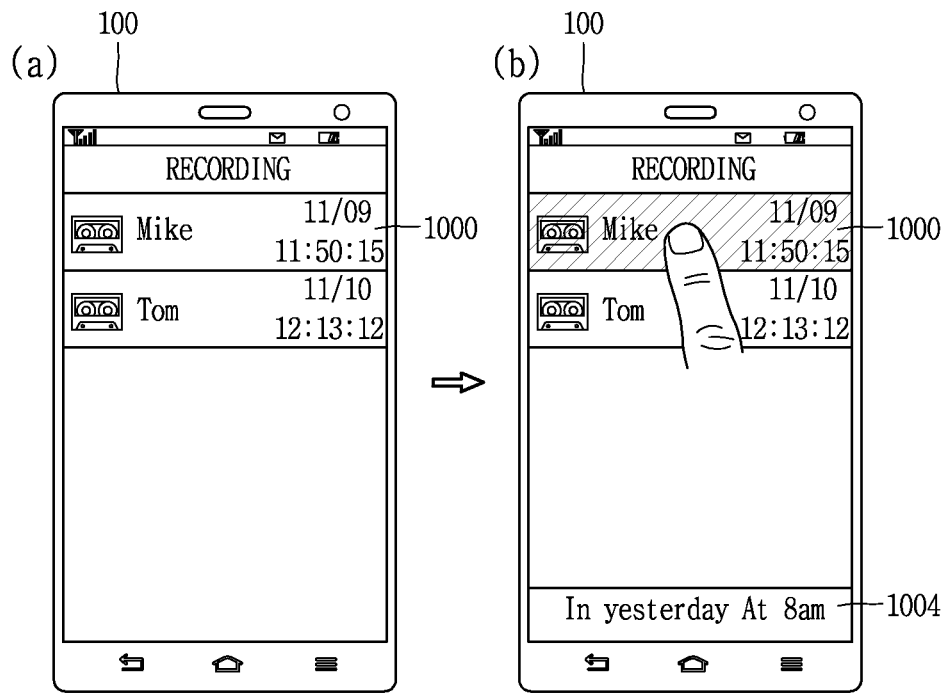
FIGS. 10A and 10B are conceptual views of a mobile terminal showing a recorded conversation of a call according to an embodiment disclosed in the present disclosure.
Figure 10B:
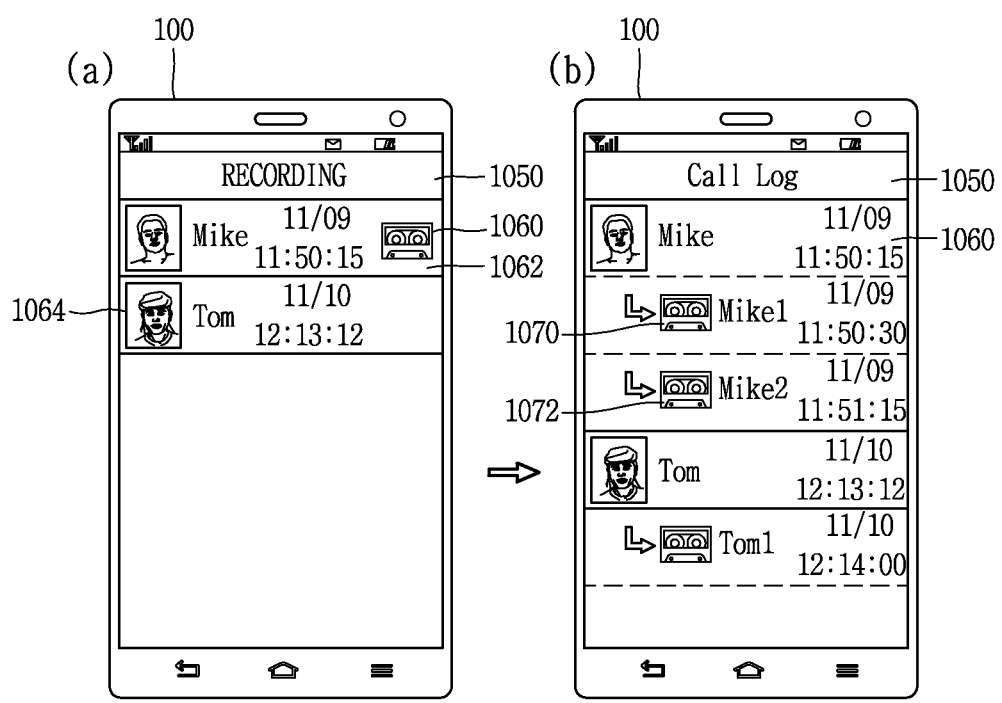

FIGS. 10A and 10B are conceptual views of a mobile device showing recorded call conversation according to one embodiment of present disclosure.

With reference to FIG. 10A, the controller 180 may display only recorded call conversation (thereafter named as "recordings") on the display unit 151 as shown in FIG. 10A (a). Here, the controller 180 may list the recordings (stored as a file format) under each call counterpart's name as shown in FIG. 10A (a). When a user selects one of the recordings, the controller 180 may display information associated with the selected recording 1000 as shown in FIG. 10A (b).

For example, the controller 180 may provide at least one portion of the recording corresponding to a user's selection as an audible signal through the audio output unit 152. Also, as shown in FIG. 10A (b), the controller 180 may display text information of at least one portion of the recording at the display unit 151 in response to a user selection.

Here, the text information may be either time information of the beginning of the recording corresponding to a user selection, the particulars of the recorded call corresponding to the user selection, or the particulars of a counterpart of a recorded call. Also, the text information may be text information converted from recorded audio signals (content) by voice recognition.

As shown in FIG. 10B, a recorded call, at least some of whose portion have been recorded, can be distinctively displayed from unrecorded calls on the display unit 151. For example, as shown in FIG. 10B (a), when a call log 1050 becomes displayed, the controller 180, in response to the call log whose certain portion has been recorded, may put a graphical object matching to the recorded call log to be distinguished.

For example, as shown in FIG. 10B (a), in response to when a portion of the call dated on November 2009 has been recorded, the controller 180 may indicate the recording by placing the graphical object 1060 adjacent to the call log 1062. Also, the controller 180, in response to when a call has not been recorded, may make a distinction between a recorded call log and an unrecorded call log by not placing any graphical object like a call log dated on November 2010.

On the other hand, even a single call log may have a plurality of recordings. In this case, as shown FIG. 10B (b), the controller 180 may display a plurality of recordings in a single call log.

For example, as shown in FIG. 10B (b), in response to when a user has recorded two different portions of a call conversation with Mike on November 2009, the controller 180 may display two graphical objects 1070, 1072 corresponding to the two respective parts adjacent to the call log 1060 with Mike dated on November 2009.

Here, as shown in FIG. 10B (b), in response to when those two recordings are closely related, the controller 180 may designate a similar filename to represent their relationship. For example, when a plurality of recordings are sequentially derived from one call conversation with the same call counterpart, files corresponding to those recordings may be listed in time sequence and labeled such that the each has been derived from the same call counterpart; therefore, the each files' interrelationship can be easily represented.

In other words, as shown in FIG. 10B (b), in response to when at least two recordings have been made during a call conversation with the same counterpart, the controller 180 may store files corresponding to the recordings respectively in a way of placing numbers next to the counterpart's name and then incrementing a number in time order, such as Mike1, Mike2.

Also, though the foregoing description illustrates an exemplary way how to label files in a consistent way in response to when the multiple files are for the same call counterpart, the labeling may be made based upon a preset time period. For example, the controller 180, in response to when recordings are performed subsequently, may specify the relevance (e.g., incrementing or decrementing a number corresponding to the time order) among the files to indicate that they are subsequently interrelated.

Also, though the foregoing description illustrates that recording information is displayed being attached to a call log, the recording information can be of course displayed differently.

For example, as shown in FIGS. 10A and 10B, in response to when recordings include information belonging to a call counterpart (e.g., a filename) the controller 180 may sort the recordings based upon the information. Also, upon receiving a request for information belonging to a call counterpart, both associated recording and the information may be provided.

In other words, when a user selects a particular party from a prestored telephone book of the mobile terminal, the controller 180 may then display prestored information (i.e., telephone number) of the selected party on the display unit 151. Also, in response to when at least one recording of the selected party is available, the controller 180 may display both the prestored recording and the prestored information of the selected party on the display unit 151.

For example, the controller 180 may display graphical objects corresponding to at least one recording as well as the selected party's phone number. Also, in response to when a user has selected any one of the graphical object, the controller 180 may display information of a recording corresponding to a user's selection on the display unit 151.

On the other hand, even if foregoing description has described a function based upon a position movement of the mobile terminal 100 as a function to switch a call counterpart or record a call, other functions can of course be available based on the position movement of mobile terminal 100.

For example, an arrival of at least two incoming call during a processing of a call of mobile terminal 100 is, of course, foreseeable. In this case, the mobile terminal 100, as one embodiment of the present disclosure, may provide a user a group call function, so each member of the group call can communicate simultaneously.

Here, the group call function can be selected and performed according to a position movement of the mobile terminal 100.

Figure 11:
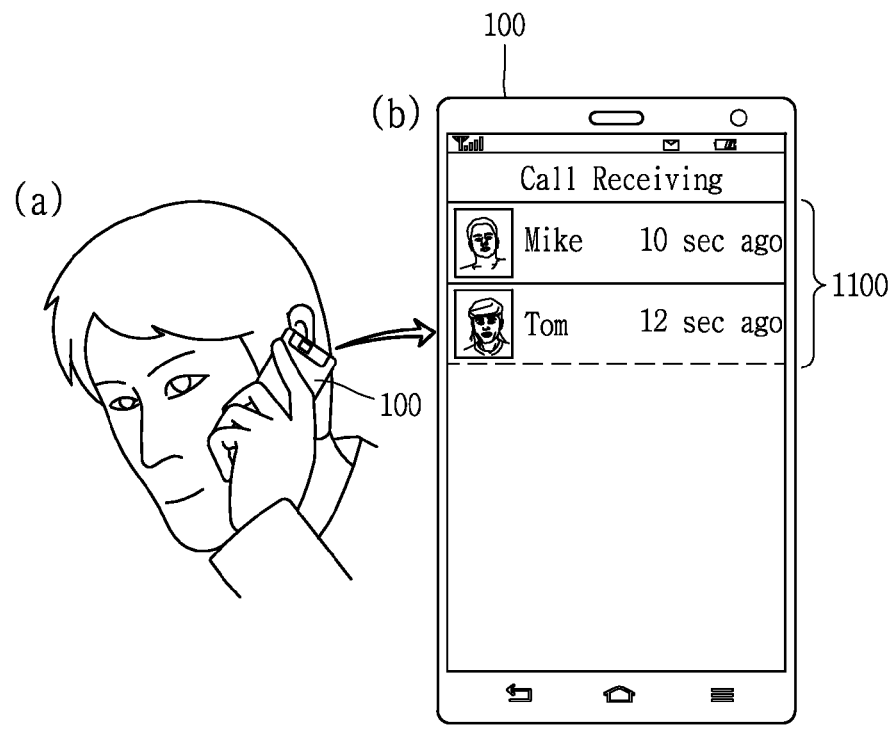
FIG. 11 is a conceptual view of a mobile device performing a group phone call based on a position movement of a mobile terminal according to one embodiment disclosed in the present disclosure.
Figure 11:
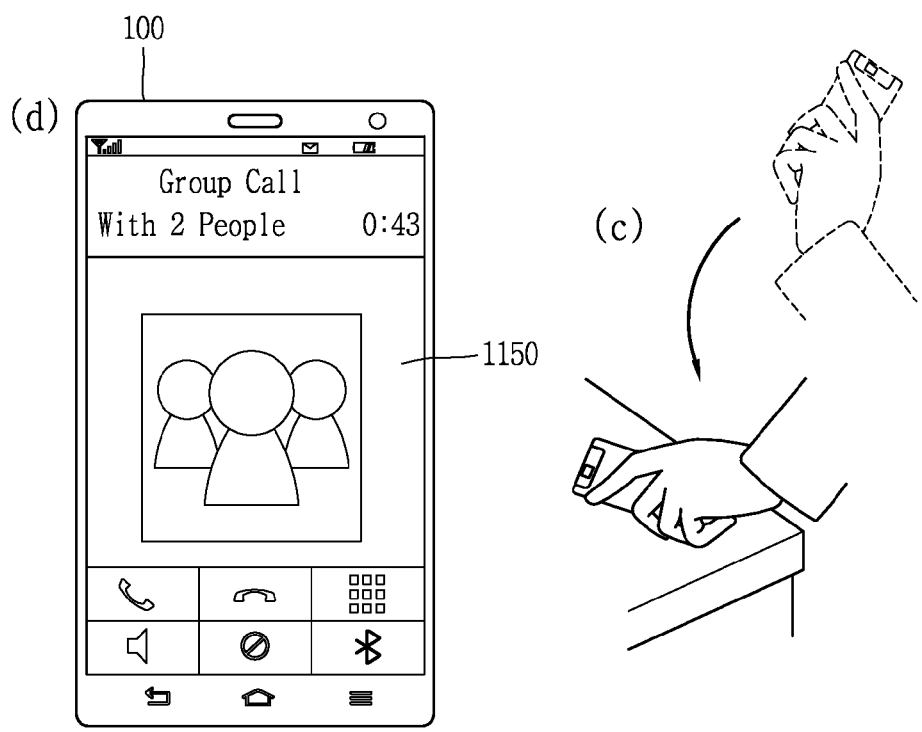

FIG. 11 are diagrams illustrating an exemplary method performing a group call by a position movement of the mobile terminal in response at least two calls' arrival while executing a call function.

For example, as shown in FIG. 11A, in response to at least two calls' arrival while performing a call function, the controller 180 may notify a user of the arrival with a vibration signal, an audio signal, or a preset bell sounding. Also, as shown in FIG. 11B, the controller 180 may display it with an image information format on display unit 151.

Also, as shown in FIG. 11B, in response to at least two calls' arrival while performing a call function, the controller 180 may execute a group call function based on a position movement of the mobile terminal 100. For example, as shown in FIG. 11C, the controller 180 may execute a group call function in response to a sensing that a mobile terminal 100 has been moved to a particular place, e.g., a table.

The controller 180 may sense a mobile terminal 100's moved state with sensors disposed at the sensing unit 140. For example, the controller 180 may determine whether the mobile terminal 100 has been put in a vertical or horizontal position with a particular sensor, such as a gyro sensor or an inertial sensor. The controller 180 may also determine whether the degree of movement of the mobile terminal 100 has exceeded a set distance away from a user using sensors, such as a proximity sensor, an ambient light sensor, or camera.

For example, based on sensing results of a proximity sensor, if a user's body is not sensed, the controller 180 may determine that a mobile terminal 100 has been placed further than preset distance from a user. Also, based on a sensing result of the ambient light sensor, if it exceeds a certain threshold level, the controller 180 may determine that a mobile terminal 100 has not been closely placed to an ear of a user. Also, using an image from a camera 121, in response to when a current user image is not received to the camera 121 or when a current user's image does not match a pre-stored user image, the controller 180 may determine that a mobile terminal 100 has been placed further than preset distance from the user.

Under this circumstance, in response to detected results from the gyro sensor or the ambient light sensor, upon determining that a mobile terminal 100 has been put in a horizontal position, the controller 180 may determine that the mobile terminal 100 has been put in the horizontal position distanced further than a certain distance from a user. Subsequently, the controller 180 may then perform the group phone call function based on those sensed position movements of the mobile terminal 100.

Therefore, as shown in FIG. 11C, in response when a user has put a mobile terminal 100 on a table being in parallel to surface of the table, upon sensing the position movement of the mobile terminal, the controller 180 may execute the group call function. Regarding this, FIG. 11D illustrates a mobile terminal 100 performing a group call function in such way according to one embodiment of the present disclosure.

On the other hand, according to one embodiment of the present disclosure, the mobile terminal 100 may of course control the call state of each group call members respectively in response to a user's selection while performing the group call.

Figure 12:
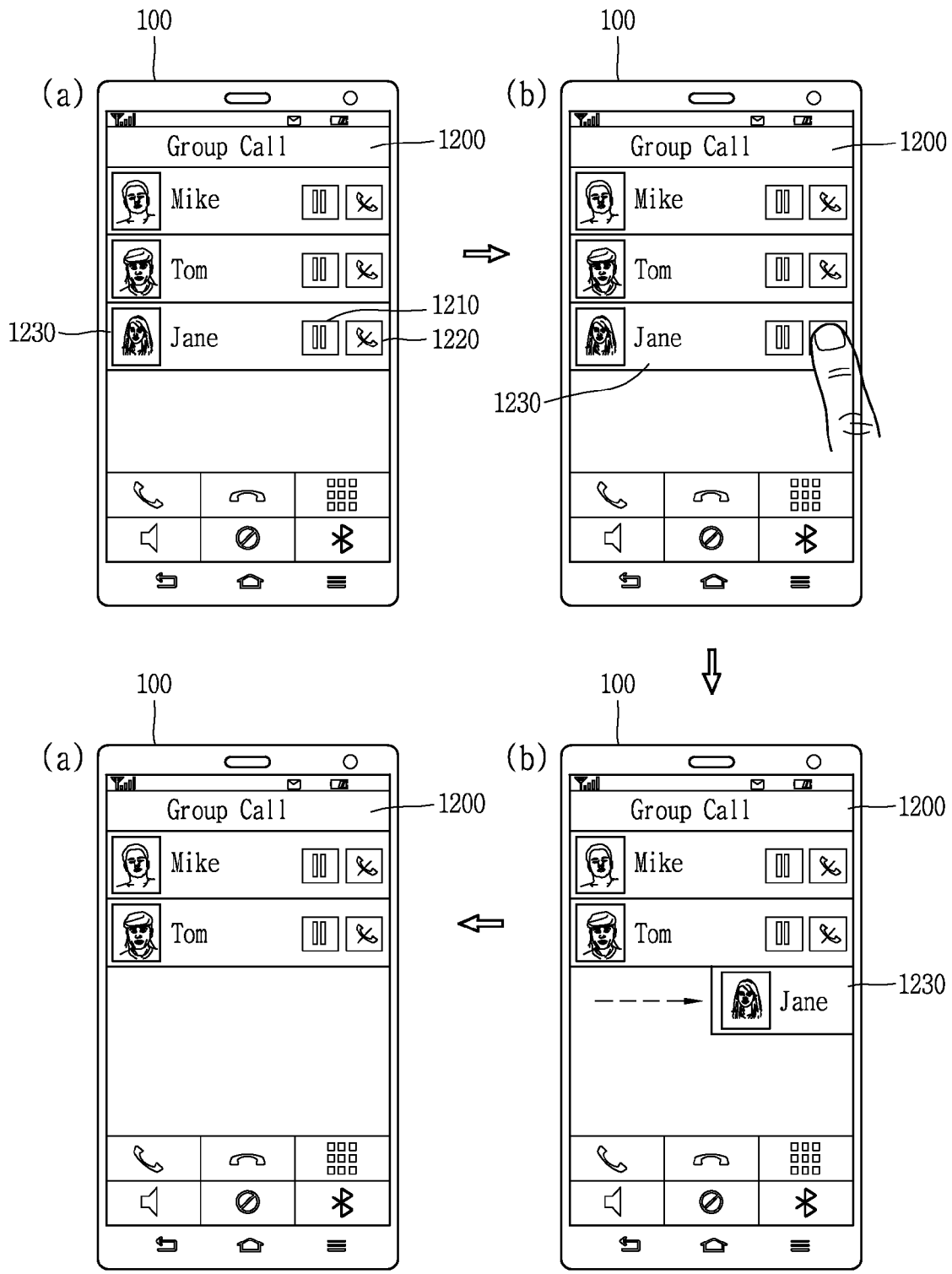
FIG. 12 are conceptual views of a mobile terminal controlling a call state of a call counterpart of the group call while processing the group call according to one embodiment disclosed in the present disclosure.

FIG. 12 illustrates the mobile terminal controlling a call state of the member of the group call while processing the group call according to one embodiment of present disclosure.

For example, as shown in FIG. 12A, when a user is conducting a group call conversation with "Mike," "Tom," and "Jane," according to one embodiment of the present disclosure, the controller 180 may display image information associated with the group call 1200.

The image information may include information of a currently connected call counterpart and at least one graphical object—the graphical object is controlling the state of the group call of a call counterpart and is matched to the each member respectively—may be displayed Here, the graphical object may represent diverse functions controlling the state of the group call. For example, the graphical object may represent a function preventing a particular member from participating the group call (i.e., terminating a particular member's group phone call).

Also, the certain graphical objects may of course be a mute function (e.g., blocking sending voice message from one group call member to other group call member), or temporarily excluding one group call member from a group call conversation (e.g., temporarily excluding a particular group call member's access to a group conversation of the group call so the conversation is not heard by the excluded member).

Using those graphical objects, a user is allowed to control the state of a group phone call of each member of the group call.

As shown in FIG. 12A, the controller 180 may put those graphical objects controlling the state of a group call of the each group call member into a position near each call counterpart's (each group call member) information. In other words, the controller 180 may put a graphical object 1220, which represents a function to remove her from a group call, or a graphical object 1210, which represents a function to temporarily block her access to the group call, into near the information of particular call counterpart, "Jane" 1230.

Under such circumstance, a user may control the state of a particular member from the list of members for the group call. For example, as shown in FIG. 12B, the user may select a graphical object 1220 matched to a call counterpart, "Jane."

Also, in response to a user's selection on any one of graphical objects, the controller 180 may control a state of one member among the list of members for a group call, who has been selected by a user. For example, as shown in FIG. 12B, in response to when a user's selected function 1220 is the function to remove the member from the group call, the controller 180 may remove "Jane" 1230 from the group call corresponding to a user's selection.

Subsequently, the communication of "Jane" 1230 for the group conversation may be terminated, and as shown in FIGS. 12C and 12D, the information of "JANE" 1230 may disappear and no longer be available at image information associated with the group call 1200.

Foregoing description illustrates a mobile terminal 100 executing particular functions based on its position movement while performing a call function. However, it is, of course, foreseeable that a user of the mobile terminal 100 becomes changed after the position movement of a mobile terminal 100. For example, there might be the cases where an owner of the mobile terminal 100 may pass the mobile terminal 100 to other person or the mobile terminal 100 has been stolen by other person while the call function is being performed.

Figure 13:
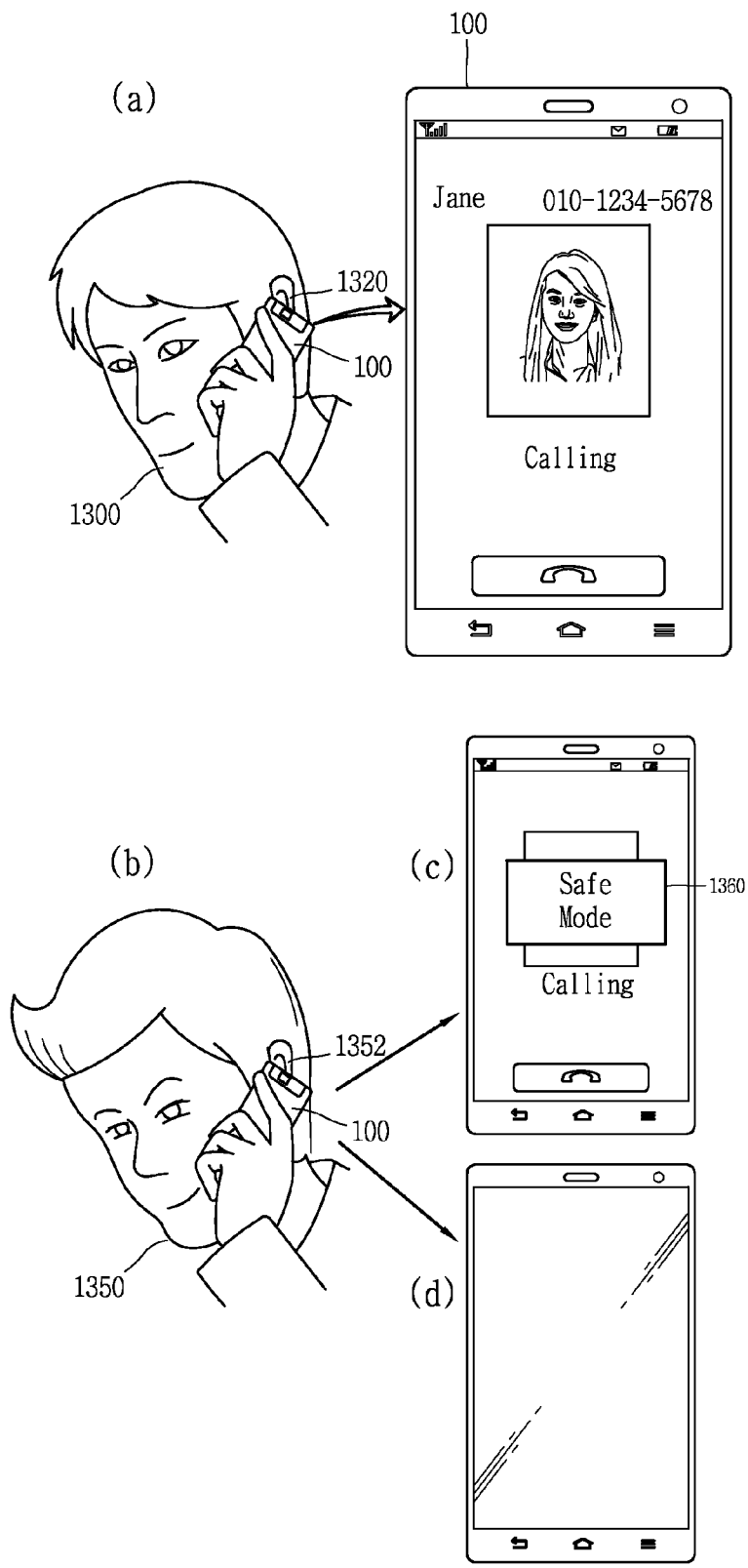
FIG. 13 is a conceptual view illustrating an exemplary operation of a mobile terminal when a user of the mobile terminal has been changed while a mobile terminal is currently performing a call function.

According to one embodiment of the present disclosure, FIG. 13 is a diagram of a mobile terminal operation in response to sensing that, while performing a call function, user has subsequently been changed after a position movement of the mobile terminal.

For example as shown FIG. 13 A, while a user 1300 has been conducting a call conversation with a mobile terminal 100 as one embodiment, the controller 180 of the mobile terminal 100 may sense and identify a user's ear 1320 that is currently closely being placed to the mobile terminal 100.

For example, the controller 180 may compare a captured ear 1320 image of a phone user 1300 sent from a camera 121 with an ear image of the phone user 1300 prestored at a memory unit 160, and then determine whether an ear of a user 1300, which is closely placed to the mobile terminal 100, is a right or a left ear of the user. Also, the controller 180, in response to when an ear of the phone user has been pressed against a touch screen of the mobile terminal, may determine whether the ear of a user 1300 pressed against the touch screen is a right or left ear of the user 1300 using the recognized ear image from the touch screen.

Under this circumstance, the sensing the user's ear may be performed again in response to a position movement of the mobile terminal 100. For example, as early described, in response to when the captured ear image by a camera 121 or a recognized ear image by the touch screen matching prestored ear identification information (e.g., relevant information of an ear image or an ear shape) in the memory unit 160 cannot be found, the controller 180 may determine that the mobile terminal 100 is currently being used by a person 1350 other than a predefined user.

Also, as shown in FIG. 13B, when a mobile terminal 100 is currently used by anyone 1350 other than a predefined user 1300, the controller 180 may recognize an ear 1352 of the user 1350 other than the predefined user 1300 and activate either a safe mode or a lock mode based upon determination whether the mobile terminal 100 has been voluntarily passed over to the other person 1350 or whether the mobile terminal 100 has been stolen by other person 1350.

The controller 180, upon sensing that the mobile terminal has been voluntarily passed over to the other person, may switch a current mode to the safe mode. However, upon sensing that the mobile terminal 100 is robbed or stolen by the other person, the controller 180 may activate the lock mode. Here, the safe mode may be a mode limiting a particular available function, like a call function, of the mobile terminal 100. The lock mode may be a mode limiting every available function of the mobile terminal 100.

For example, the controller 180 may further sense a surrounding environment of the mobile terminal 100 to verify whether the mobile terminal 100 has been stolen or has been voluntarily passed over to the other person. For example, in response to either an occurrence of excessively loud sounds over a preset volume range or an occurrence of an excessive pressure or acceleration, the controller may determine that the mobile terminal 100 has been stolen by the other person 1350. If not, the controller 180 will assume that the mobile terminal 100 has been voluntarily passed over to the other person 1350 with a user's 1300 consent.

Then, in response to a sensing that a mobile terminal 100 has been passed over to the other person 1350, the controller 180 may then switch a current mode to a safe mode. For example, the safe mode may be an operation mode limiting a call function. In other words, the safe mode can be an operation mode limiting either call receiving or a microphone function. In other words, it allows a current user's hearing a call counterpart's voice, but a voice from the person 1350 may not be transmitted to a connected call counterpart.

Having switched to the safe mode, the controller 180 may then alert the safe mode to a current user through vibrations, a voice message, or bell soundings. Also, as shown in FIG. 13 C, a graphical object 1360 representing the safe mode may be displayed on the display unit 151.

In addition, in the safe mode, the controller 180 may also store a record of switching to the safe mode at a call log. For example, in response to when a phone user passes over the mobile terminal 100 to a different person during conversation with a call counterpart, the controller 180 may activate a safe mode and a record of a switching to the safe mode may be stored into a call log of the call counterpart.

For example, after an occurrence of switching to a safe mode, in response to when a mobile terminal 100 has been returned to a predefined user thereby releasing a safe mode, the recordings of the switching (to a the safe mode) and the releasing time will be included in the call log. Also, in response to when a call is terminated during the safe mode, the call log may include the time information, such as switching time to the safe mode and a record of the call termination in the safe mode.

Also, the controller 180 may also allow the user to edit a record of a switching among operation modes included in a call log. For example, a user may record the information— i.e., information of to whom the mobile terminal 100 was handed over and an identity of a call counterpart when the safe mode was activated—by editing the switching record of the safe mode in the call log.

On the hand, in response to determination that the mobile terminal 100 has been stolen by a different person 1350, the controller 180 may switch from an operation mode to a lock mode. The lock mode, for example, may be a mode limiting every available function of the mobile terminal 100. In other words, as shown in FIG. 13D, the lock mode may be a mode limiting all available functions of the mobile terminal; therefore it may inactivate the display unit 151, thereby locking all available information to be displayed on a display unit 151.

Once switching to the lock mode has been made, the controller 180 may only allow an operation to unlock (release) the lock mode. For example, while turning on a touch-screen, the controller 180 may display a pattern lock screen at least one portion of the display unit 151 in response to a touch input. Also, in response to the touch input entered on the touch screen, the controller 180 may unlock the lock mode. Also, in response to sensing an entered touch input on the touch screen, the controller 180 may display a screen to receive a preset password and release the lock mode on the basis of whether the entered one matches the preset password.

In addition, according to one embodiment of the present disclosure, the mobile terminal 100 may of course use a sensed image of the user's ear to release the lock mode. For example, the controller 180, in response to sensing that captured ear image of the user by the camera 121 becomes matched with the stored ear image, may release the lock mode. Also, the controller 180, in response to sensing that sensed ear image of the user by a touch screen becomes matched with the stored ear image, may release the lock mode.

As such, according to one embodiment of the present disclosure, without using a predefined pattern lock or entering preset password, the mobile terminal 100 may also release the lock mode merely by placing a mobile terminal 100 a position adjacent to an ear of a predefined phone user to use.

According to one embodiment of the present disclosure, the mobile terminal and control methods thereof enable a user to select a desired function without entering a touch input based on sensing a movement of the mobile terminal, so a phone user is allowed to select and execute a desired function under challenging conditions.

According to one embodiment of the present disclosure, the mobile terminal and control methods thereof may perform diverse available functions while implementing a call function by sensing a movement of the mobile terminal.

According to an exemplary embodiment, the methods described above may be implemented as codes readable by a processor on a medium written by a program. Examples of the processor-readable media may include ROM, RAM, CD-ROM, magnetic tape, floppy disk, and optical data storage device, ant the like, and also include a device implemented in the form of a carrier wave (for example, transmission via the internet).

The foregoing description, for purpose of explanation, has been described with reference to specific embodiments. However, the illustrative discussions above are not intended to be exhaustive or to limit the invention to the precise forms disclosed. Many modifications and variations are possible in view of above teaching. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A mobile terminal, comprising:
   a wireless communication unit;
   a camera; and
   a controller configured to:
   determine an occurrence of a movement of the mobile terminal by comparing a user's ear sensed by the camera with a pre-stored ear image when an incoming second call is received while a first call is connected via the wireless communication unit,
   determine, in response to the occurrence of the movements of the mobile terminal, whether a user currently using the mobile terminal is an authorized user based on a result of the comparison;
   perform one of different functions based on whether the user currently using the mobile terminal is the authorized user, wherein the connected first call is switched to the second incoming call to connect the second incoming call when the authorized user's ear sensed by the camera matches the pre-stored ear image and when the movement is determined as a movement of the mobile terminal from a first ear of the authorized user to a second ear of the authorized user; and
   execute a safe mode to disable connecting the second incoming call when the user's ear sensed by the camera is different from the pre-stored ear image.

2. The mobile terminal of claim 1, wherein the controller is further configured to recognize a gesture of the movement of the mobile terminal based on user gesture information stored in a memory.

3. The mobile terminal of claim 1, wherein the controller is further configured to:
   identify the first ear or the second ear of the authorized user when the mobile terminal is placed adjacent to the first ear or the second ear of the authorized user based on ear identification information stored in a memory; and
   determine when the mobile terminal is moved from adjacent to one of the first or second ear to adjacent to the other of the first or second ear.

4. The mobile terminal of claim 1, wherein the movement of the mobile terminal comprises a movement of the mobile terminal to a horizontal position.

5. The mobile terminal of claim 1, wherein the controller is further configured to change the mobile terminal from the safe mode to a normal function mode when the mobile terminal is placed to the first ear or the second ear of the authorized user that matches the pre-stored ear image while the mobile terminal is in the safe mode.

6. The mobile terminal of claim 1, wherein the controller is further configured to provide notification of the receipt of the second call while the first call is connected by generating a voice signal, audio alert, or acoustic signal.

7. A method of controlling a mobile terminal comprising a camera, the method comprising:
   determining an occurrence of a movement of the mobile terminal by comparing a user's ear sensed by the camera with a pre-stored ear image when an incoming second call is received while a first call is connected;
   determining, in response to the occurrence of the movements of the mobile terminal, whether a user currently using the mobile terminal is an authorized user based on a result of the comparison;
   performing one of different functions based on whether the user currently using the mobile terminal is the authorized user, wherein the connected first call is switched to the second incoming call to connect the second incoming call when the authorized user's ear sensed by the camera matches the pre-stored ear image and when the movement is determined as a movement of the mobile terminal from a first ear of the authorized user to a second ear of the authorized user; and executing a safe mode to disable connecting the second incoming call when the user's ear sensed by the camera is different with the pre-stored ear image.

8. The method of claim 7, further comprising recognizing a gesture of the movement of the mobile terminal based on user gesture information stored in a memory.

9. The method of claim 8, further comprising:

identifying the first ear or the second ear of the authorized user when the mobile terminal is placed adjacent to the first ear or the second ear of the authorized user based on ear identification information stored in the memory; and determine when the mobile terminal is moved from one of the first or second ear to the other of the first or second ear.

10. The method of claim 7, further comprising changing the mobile terminal from the safe mode to a normal function mode when the mobile terminal is placed to the first ear or the second ear of the authorized user that matches the pre-stored ear image while the mobile terminal is in the safe mode.

11. The method of claim 7, further comprising providing notification of the receipt of the second call while the first call is connected by generating a voice signal, audio alert, or acoustic signal.

* * * * *